United States Patent
Kodan et al.

(10) Patent No.: US 8,996,306 B2
(45) Date of Patent: Mar. 31, 2015

(54) ROUTE SEARCH DEVICE AND METHOD, INFORMATION PROVIDING DEVICE AND METHOD, AND ROUTE SEARCH SYSTEM

(75) Inventors: Tomoki Kodan, Nagoya (JP); Yasuhiro Shimizu, Tokoname (JP); Ichiro Usami, Anjo (JP); Hiroyuki Kozakai, Okazaki (JP)

(73) Assignees: Toyota Jidosha Kabushiki Kaisha, Toyota (JP); Denso Corporation, Kariya (JP); Aisin AW Co., Ltd., Anjo (JP)

( * ) Notice: Subject to any disclaimer, the term of this patent is extended or adjusted under 35 U.S.C. 154(b) by 345 days.

(21) Appl. No.: 13/500,994

(22) PCT Filed: Oct. 20, 2010

(86) PCT No.: PCT/IB2010/002689
§ 371 (c)(1), (2), (4) Date: Apr. 9, 2012

(87) PCT Pub. No.: WO2011/048476
PCT Pub. Date: Apr. 28, 2011

(65) Prior Publication Data
US 2012/0209509 A1      Aug. 16, 2012

(30) Foreign Application Priority Data

Oct. 21, 2009   (JP) ................................. 2009-242526

(51) Int. Cl.
*G01C 21/00* (2006.01)
*G06F 17/30* (2006.01)
(Continued)

(52) U.S. Cl.
CPC .............. *G01C 21/32* (2013.01); *G01C 21/362* (2013.01)
USPC ........... 701/445; 701/411; 701/420; 701/446; 701/450; 701/461; 701/462; 701/484; 701/485; 701/518; 701/520

(58) Field of Classification Search
CPC ................................ G01C 21/30; G01S 19/07
USPC ......... 701/411, 420, 445, 446, 450, 451, 461, 701/462, 484, 485, 518, 520, 510
See application file for complete search history.

(56) References Cited

U.S. PATENT DOCUMENTS 6,178,377 B1   1/2001   Ishihara et al.
7,047,247 B1   5/2006   Petzold et al.
(Continued)

FOREIGN PATENT DOCUMENTS

EP   0 932 134 A1   7/1999
EP   1 901 260 A1   3/2008
(Continued)

OTHER PUBLICATIONS

Feb. 14, 2011 International Search Report issued in International Patent Application No. PCT/IB2010/002689.
(Continued)

*Primary Examiner* — Khoi Tran
*Assistant Examiner* — Robert Nguyen
(74) *Attorney, Agent, or Firm* — Oliff PLC

(57) ABSTRACT

A route search device including a database in which map information and facility information are stored, a reference location information obtaining unit that obtains reference location information as location information of a given point from an outside of the route search device, a location information obtaining unit that obtains location information of a desired facility from the outside, a corresponding location information obtaining unit that obtains corresponding location information as location information of a point corresponding to the given point, from the database, a location correction factor calculating unit that calculates a location correction factor, a location correction factor storage unit that stores the location correction factor, a location information correcting unit that corrects the location information of the desired facility, using the location correction factor, and a route searching unit that makes a search for a route to the desired facility, based on the corrected location information.

10 Claims, 12 Drawing Sheets

(51) Int. Cl.
*G06F 7/00* (2006.01)
*G01C 21/26* (2006.01)
*G01C 21/30* (2006.01)
*G01C 21/32* (2006.01)
*G01C 21/36* (2006.01)

(56) References Cited

U.S. PATENT DOCUMENTS

| | | | |
|---|---|---|---|
| 7,558,676 B2 * | 7/2009 | Jones | 702/14 |
| 2006/0158373 A1 * | 7/2006 | Kamei | 342/357.03 |
| 2009/0319188 A1 | 12/2009 | Otto | |

FOREIGN PATENT DOCUMENTS

| | | |
|---|---|---|
| JP | A-2005-300394 | 10/2005 |
| JP | A-2006-200933 | 8/2006 |
| JP | A-2008-122256 | 5/2008 |
| WO | WO 98-12688 | 3/1998 |
| WO | WO 2008/010699 A1 | 1/2008 |

OTHER PUBLICATIONS

Feb. 14, 2011 Written Opinion of the International Searching Authority issued in International Patent Application No. PCT/IB2010/002689.

* cited by examiner

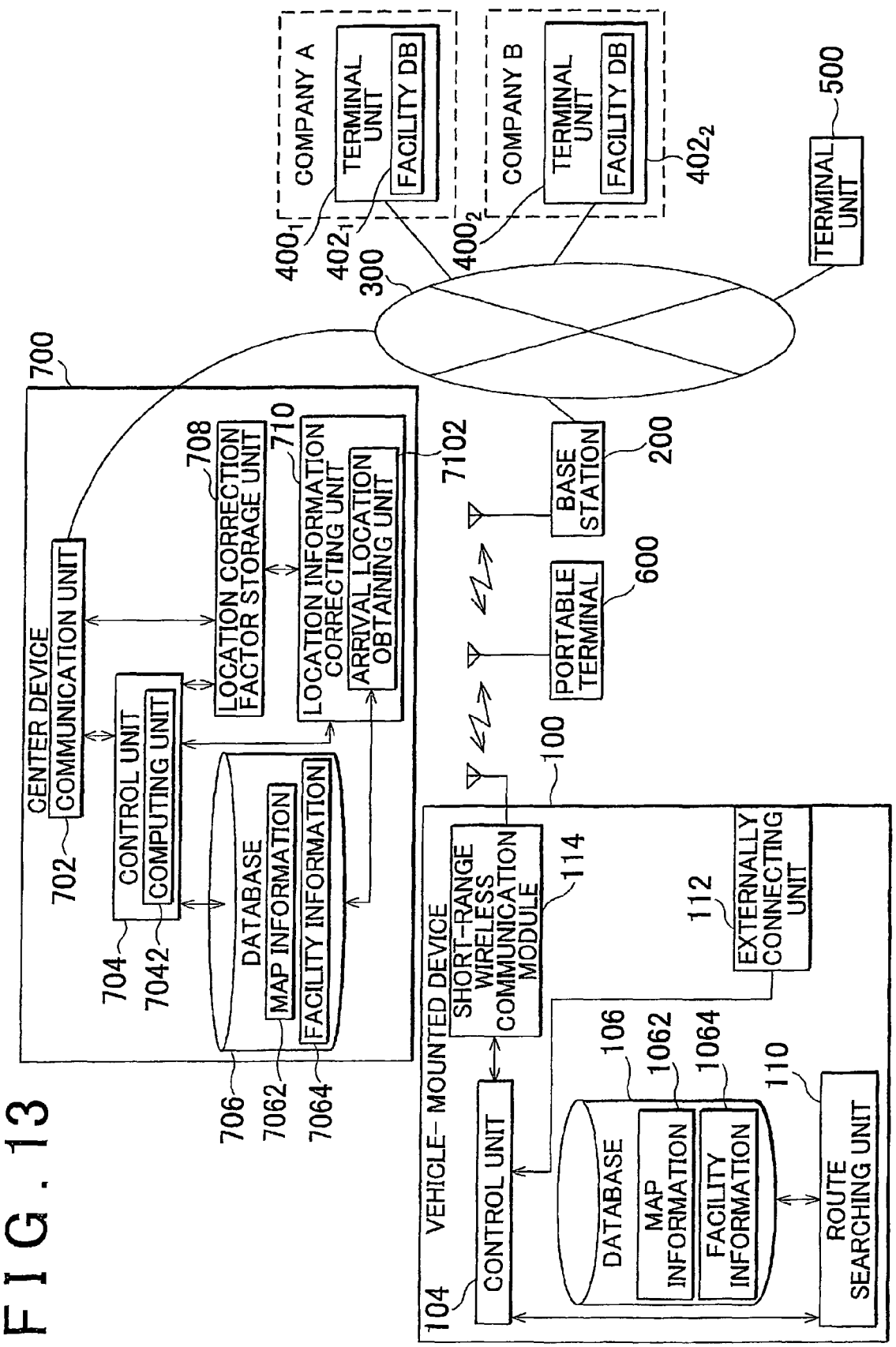

ROUTE SEARCH DEVICE AND METHOD, INFORMATION PROVIDING DEVICE AND METHOD, AND ROUTE SEARCH SYSTEM

BACKGROUND OF THE INVENTION

1. Field of the Invention

The invention relates to a route search device, and more particularly to a route search device that is installed on a mobile unit and is operable to obtain facility information from an outside thereof, a method of making a search for a route, information providing device and method, and a route search system.

2. Description of the Related Art

A vehicle-mounted device, such as a car navigation system, which offers a route guidance makes a search for a route to a facility as a destination selected by a user, from a map database stored in the vehicle-mounted device. The map database includes facility information as well as map information. The facility information is created or prepared by each manufacturer. When the database needs to be updated, a recording medium in which new map information is recorded is provided to the vehicle-mounted device. However, when the map information is updated using the recording medium, the map information stored in the recording medium may not be the latest map information any longer. Also, since there is a limit to the capacity of the recording medium in which data can be recorded, it is not always possible to update all the information that needs to be updated.

Owing to the proliferation of the Internet, it has been proposed to find and retrieve a facility as a destination from a website, for example, and cause the vehicle-mounted device to obtain the result of the retrieval and make a search for a route to the facility.

SUMMARY OF INVENTION

In some cases, a location specified by location information retrieved from a website does not coincide with a location specified by map information stored in the vehicle-mounted device. When the vehicle-mounted device makes a route search, the location information of a facility obtained by searching a website needs to be associated or related with map information used in the vehicle-mounted device. However, when the location indicated by the location information retrieved from the website does not coincide with the location on the map information stored in the vehicle-mounted device, the location of the facility indicated by the location information from the website, as viewed on the map information stored in the vehicle-mounted device, deviates from the location of the same facility on the map information stored in the vehicle-mounted device, resulting in the occurrence of an error. For example, an error of several hundreds meters may occur due to a difference in the geodetic system.

The Japanese Geodetic System is often employed in car navigation systems. Other than the Japanese Geodetic System, the World Geodetic System is known. Some location information of facilities retrieved from websites is prepared based on the World Geodetic System. For example, differences or displacements of about 400 meters may arise between the latitude and longitude determined by the World Geodetic System and the latitude and longitude determined by the Japanese Geodetic System.

The present invention provides a route search device, method of making a route search, information providing device and method, and a route search system, wherein location information of a facility obtained from an outside of the route search device is corrected so as to match map information stored in the route search device when the route search device installed on a mobile unit makes a route search.

A first aspect of the invention provides a route search device installed on a mobile unit, which includes: a database in which map information and facility information are stored; a reference location information obtaining unit that obtains reference location information as location information of a given point from an outside of the route search device; a location information obtaining unit that obtains location information of a desired facility from the outside of the route search device; a corresponding location information obtaining unit that obtains corresponding location information as location information of a point corresponding to the given point, from the database; a location correction factor calculating unit that calculates a location correction factor used for correcting the location information of the desired facility, based on the reference location information and the corresponding location information; a location correction factor storage unit that stores the location correction factor; a location information correcting unit that corrects the location information of the desired facility, using the location correction factor; and a route searching unit that makes a search for a route to the desired facility, based on the corrected location information of the desired facility.

A second aspect of the invention provides an information providing device that provides information to a route search device installed on a mobile unit, which includes: a database in which map information and facility information similar to map information and facility information stored in the route search device are stored; a reference location information obtaining unit that obtains reference location information as location information of a given point, from an outside of the route search device; a corresponding location information obtaining unit that obtains corresponding location information as location information of a point corresponding to the given point, from the database; a location correction factor calculating unit that calculates a location correction factor used for correcting location information of a desired facility obtained from the outside of the route search device, based on the reference location information and the corresponding location information; a location correction factor storage unit that stores the location correction factor; and a location correction factor transmitting unit that transmits the location correction factor to the route search device.

A third aspect of the invention provides an information providing device that provides information to a route search device installed on a mobile unit, which includes: a database in which map information and facility information similar to map information and facility information stored in the route search device are stored; a reference location information obtaining unit that obtains reference location information as location information of a given point, from an outside of the route search device; a location information obtaining unit that obtains location information of a desired facility, from the outside of the route search device; a corresponding location information obtaining unit that obtains corresponding location information as location information of a point corresponding to the given point, from the database; a location correction factor calculating unit that calculates a location correction factor used for correcting the location information of the desired facility, based on the reference location information and the corresponding location information; a location correction factor storage unit that stores the location correction factor; a location information correcting unit that corrects the location information of the desired facility, using the location correction factor; and a corrected location information transmitting unit that transmits the corrected location information of the desired facility to the route search device.

A fourth aspect of the invention provides a route search system for a mobile unit, which includes a route search device that is installed on the mobile unit and obtains location information of a desired facility from an outside thereof, and an information providing device that provides information to the route search device. The information providing device includes: a database in which map information and facility information similar to map information and facility information stored in the route search device are stored; a reference location information obtaining unit that obtains reference location information as location information of a given point, from the outside of the route search device; a corresponding location information obtaining unit that obtains corresponding location information as location information of a point corresponding to the given point, from the database; a location correction factor calculating unit that calculates a location correction factor used for correcting the location information of the desired facility, based on the reference location information and the corresponding location information; a location correction factor storage unit that stores the location correction factor; and a location correction factor transmitting unit that transmits the location correction factor to the route search device. The route search device includes: a location correction factor obtaining unit that obtains the location correction factor from the information providing device; a location information correcting unit that corrects the location information of the desired facility, using the location correction factor; and a route searching unit that makes a search for a route to the desired facility, based on the corrected location information of the desired facility.

A fifth aspect of the invention provides a route search system for a mobile unit, which includes a route search device that is installed on the mobile unit and obtains location information of a desired facility from an outside thereof, and an information providing device that provides information to the route search device. The information providing device includes: a database in which map information and facility information similar to map information and facility information stored in the route search device are stored; a reference location information obtaining unit that obtains reference location information as location information of a given point, from the outside of the route search device; a location information obtaining unit that obtains location information of a desired facility from the outside of the route search device; a corresponding location information obtaining unit that obtains corresponding location information as location information of a point corresponding to the given point, from the database; a location correction factor calculating unit that calculates a location correction factor used for correcting the location information of the desired facility, based on the reference location information and the corresponding location information; a location correction factor storage unit that stores the location correction factor; a location information correcting unit that corrects the location information of the desired facility, using the location correction factor; and a corrected location information transmitting unit that transmits the corrected location information of the desired facility to the route search device. The route search device includes: a location information obtaining unit that obtains the corrected location information of the desired facility, from the information providing device; and a route searching unit that makes a search for a route to the desired facility, based on the corrected location information of the desired facility.

A sixth aspect of the invention provides a route searching method implemented by a route search device that is installed on a mobile unit and has a database in which facility information and map information are stored, which method includes the steps of: obtaining reference location information as location information of a given point, from an outside of the route search device; obtaining location information of a desired facility from the outside; obtaining corresponding location information as location information of a point corresponding to the given point, from the database; calculating a location correction factor used for correcting the location information of the desired facility, based on the reference location information and the corresponding location information; storing the location correction factor; correcting the location information of the desired facility, using the location correction factor; and making a search for a route to the desired facility, based on the corrected location information of the desired facility.

A seventh aspect of the invention provides an information providing method implemented by an information providing device that provides information to a route search device that is installed on a mobile unit, wherein the route search device stores map information and facility information, which method includes the steps of: obtaining reference location information as location information of a given point, from an outside of the route search device; obtaining corresponding location information as location information of a point corresponding to the given point, from a database in which map information and facility information similar to the map information and facility information stored in the route search device are stored; calculating a location correction factor used for correcting location information of a desired facility, based on the reference location information and the corresponding location information; storing the location correction factor; and transmitting the location correction factor to the route search device.

An eighth aspect of the invention provides an information providing method implemented by an information providing device that provides information to a route search device that is installed on a mobile unit, wherein the route search device stores map information and facility information, which method includes the steps of: obtaining reference location information as, location information of a given point, from an outside of the route search device; obtaining location information of a desired facility from the outside of the route search device; obtaining corresponding location information as location information of a point corresponding to the given point, from a database in which map information and facility information similar to the map information and facility information stored in the route search device are stored; calculating a location correction factor used for correcting the location information of the desired facility, based on the reference location information and the corresponding location information; storing the location correction factor; correcting the location information of the desired facility, using the location correction factor; and transmitting the corrected location information of the desired facility to the route search device.

According to the first through eighth aspects of the invention, when the route search device, such as a vehicle-mounted device, installed on a mobile unit makes a route search, it can correct location information of a facility obtained from the outside thereof so that the corrected location information matches map information stored in the route search device.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein:

FIG. 13 is an explanatory view showing one example of system according to a sixth embodiment of the invention.

DETAILED DESCRIPTION OF EMBODIMENTS

Figure 1:
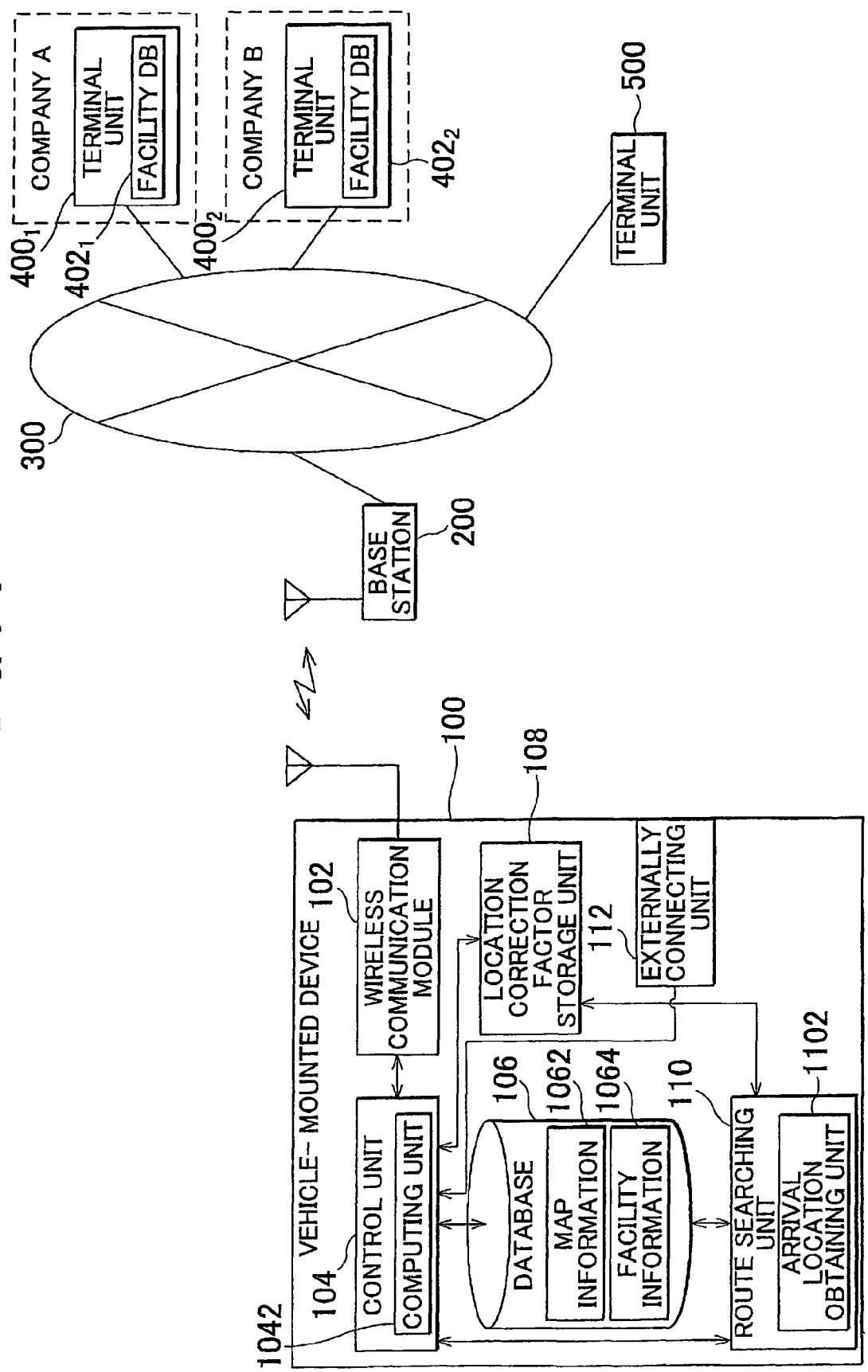
FIG. 1 is an explanatory view showing one example of system in which a vehicle-mounted device according to a first embodiment of the invention is used.

Some embodiments of the invention will be described with reference to the drawings. In all of the figures used for explanation of the embodiments, the same reference numerals are assigned to the same or corresponding elements or units having the same functions, of which repeated description will not be provided.

First Embodiment

FIG. 1 shows a system in which a vehicle-mounted device according to a first embodiment of the invention is used.

The system has the vehicle-mounted device 100, a base station 200, and terminal units 400 ($400_1$, $400_2$). The vehicle-mounted device 100 is one example of route search device installed on a motor vehicle as a mobile unit. For example, the vehicle-mounted device 100 may be a navigation system. The vehicle-mounted device 100 and the base station 200 are connected to each other for wireless communications in a certain mode of wireless communication. The base station 200 is connected to a communication network 300. The Internet is one example of the communication network 300.

Each of the terminal units 400 is provided in, for example, a company. The company may provide maps, or may use maps when it provides information. The terminal unit 400 has a facility database (DB) 402. Facility information is stored in the facility database (DB) 402. The facility information includes the names of facilities, and location information of the facilities. The location information of the facilities indicates locations of the facilities as viewed on a map possessed by the terminal unit 400. In this embodiment, the case where a terminal unit $400_1$ is provided in a company A and a terminal unit $400_2$ is provided in a company B will be described as one example. The terminal unit $400_1$ has a facility database $402_1$, and the terminal unit $400_2$ has a facility database $402_2$. The system of the invention may have only one terminal unit, or may have three or more terminal units. Also, each company may have two or more terminal units.

The vehicle-mounted device 100 makes access to the communication network 300 via the base station 200. Then, the vehicle-mounted device 100 obtains facility information of a given facility stored in the terminal unit 400, from the terminal unit 400 connected to the communication network 300. Then, the vehicle-mounted device 100 compares location information of the given facility included in the facility information of the given facility obtained from the terminal unit 400, with location information indicating the location of the given facility on map information stored in the vehicle-mounted device 100, and calculates an error between the location indicated by the location information of the terminal unit 400 and the location indicated by the location information of the vehicle-mounted device 100. The vehicle-mounted device 100 stores the thus calculated error in location as a location correction factor. The location error may be stored for each company that provides maps, or may be stored for each company that uses maps when it provides information. This is because all of the maps provided or used by a certain company are supposed to be prepared based on the same geodetic system. For comparison of the location information, location information of a reference point set in advance according to the geodetic system may be used, instead of using the location information of a given facility. However, the use of location information of a given facility as illustrated in this embodiment is still advantageous because location information to be compared with location information stored in the vehicle-mounted device 100 can be easily retrieved from a website, i.e., can be easily obtained by searching a website. In the following description, facility/location information of a given facility or reference point, which is obtained from the outside of the vehicle-mounted device 100, e.g., from the terminal unit 400, will be called "outside-source reference facility/location information". Also, facility/location information indicating the location of the given facility or reference point on map information stored in the vehicle-mounted device 100 (facility/location information corresponding to the outside-source reference facility/location information) will be called "vehicle-mounted-device reference facility/location information".

The vehicle-mounted device 100 may be adapted to calculate a location error or errors at certain intervals, or may be adapted to calculate a location error or errors when the device 100 is turned on. Also, the vehicle-mounted device 100 may calculate a location error for each specified region, for example, for each of the municipalities (cities, towns and villages). Also, the vehicle-mounted device 100 may calculate a location error or errors according to the user's operation. In this connection, the network of reference points based on the Japanese Geodetic System is established by a triangulation network formed from old survey results. Accordingly, the network of reference points based on the Japanese Geodetic System involves distortion due to a factor other than the geodetic system. By calculating a location error for each specified region, an influence due to the distortion of the network of reference points can be reduced.

The vehicle-mounted device 100 makes a search for a route to a destination designated by the user. If the destination is a facility obtained from the outside, the vehicle-mounted device 100 obtains a location correction factor corresponding to location information included in facility information of the facility in question, when it makes a search for the route. The above-mentioned outside includes communication networks and recording media. Then, the vehicle-mounted device 100 corrects the location information of the facility, using the location correction factor. In the following description, the facility/location information of the facility obtained as the destination from the outside will be called "destination facility/location information". Also, the location information of the facility corrected using the location correction factor will be called "corrected location information". For example, the vehicle-mounted device 100 specifies the company in which the terminal unit 400 is provided, and obtains a location correction factor that is selected from location correction factors calculated for the specified company and corresponds to a region including the location indicated by the destination location information.

The vehicle-mounted device 100 determines whether the corrected location information indicates a point within a site (region) of the facility included in map information stored in the vehicle-mounted device 100. If the corrected location information indicates a point within the site of the facility included in the map information stored in the vehicle-mounted device 100, the vehicle-mounted device 100 obtains arrival location information, such as arrival-point coordinates, indicating an arrival location of the facility.

Figure 2:
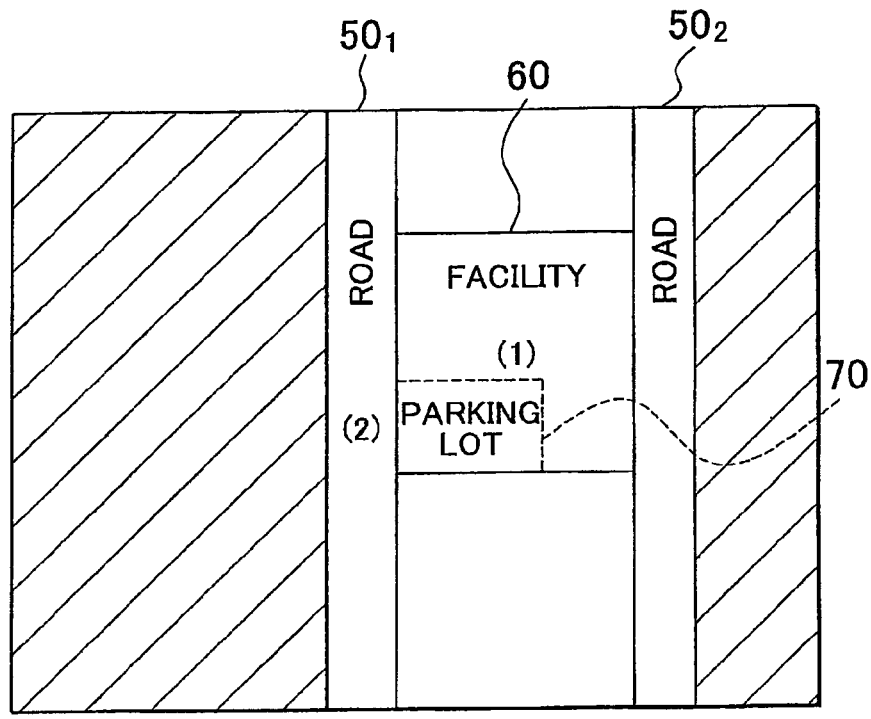
FIG. 2 is a view useful for explaining a route searching process of the vehicle-mounted device according to the first embodiment of the invention.

FIG. 2 indicates map information including an arrival location of a facility. On the map information shown in FIG. 2, a site 60 of the facility is located between a road $50_1$ and a road $50_2$, and a parking lot 70 is placed in the site 60 of the facility. For example, when location (1) as shown in FIG. 2 is indicated as the corrected location information, the road $50_1$ or $50_2$ is set as an arrival location. This is because, if the location (1) is set as a destination, the vehicle would be located within the site of the facility, which is unlikely to happen or is not supposed to naturally happen. Where the parking lot 70 is placed in the site 60 of the facility, as shown in FIG. 2, the vehicle-mounted device 100 is able to grasp the location of the parking lot 70. Accordingly, when the location (1) is indicated as the corrected location information, and the location of the parking lot is grasped, the entrance (2) of the parking lot is set as the arrival location. Namely, while the representative location of the facility is the location (1), the parking lot 70 is set as the arrival location of the facility.

When the corrected location information indicates a point within the site of the facility included in the map information stored in the vehicle-mounted device 100, the vehicle-mounted device 100 makes a search for a route to the arrival location of the facility. On the other hand, when the corrected location information does not indicate a point within the site of the facility included in the map information stored in the vehicle-mounted device 100, the vehicle-mounted device 100 makes a search for a route to a location indicated by the corrected location information.

The system may also have a terminal unit 500. The terminal unit 500 is connected to the communication network 300. The terminal unit 500 obtains outside-source reference facility information from the communication network 300. Then, the terminal unit 500 records the outside-source reference facility information onto a recording medium. The recording medium may be, for example, a CD-R (Compact Disk Recordable), DVD (Digital Versatile Disk), USB (Universal Serial Bus) memory, or a SD card. For example, the terminal unit 500 may be a PC installed in the house of the user of the vehicle-mounted device. In this case, if the user finds a facility which he/she wants to go to when watching a website, for example, the user may record facility information of the facility onto a recording medium. The vehicle-mounted device 100 is notified of the thus recorded facility information via the recording medium.

The vehicle-mounted device 100 according to the first embodiment has a wireless communication module 102. The wireless communication module 102 is wirelessly connected with the base station 200, to conduct wireless communications with the base station 200 in a certain mode of wireless communication. The wireless communication module 102 may consist of a data communication module (DCM), so that the module 102 can be connected to the communication network 300 without requiring a portable terminal to be interposed therebetween. The above-indicated wireless communication mode or system may be selected from, for example, Global System for Mobile Communications (GSM), Wideband Code Division Multiple Access (Wideband CDMA), Code Division Multiple Access (CDMA), Personal Digital Cellular (PDC), and so forth. Also, a next-generation wireless communication mode, such as Long Term Evolution (LTE), may be employed. The wireless communication module 102 feeds outside-source reference facility information and destination facility information obtained from the terminal unit 400 to the control unit 104.

The vehicle-mounted device 100 of this embodiment has a database 106. Map information 1062 and facility information 1064 are stored in the database 106. The map information 1062 is used for enabling the vehicle-mounted device 100 to make a route search and offer a route guidance. The map information 1062 may be prepared based on the Japanese Geodetic System. The facility information 1064 is contained in the map information 1062. The facility information 1064 may include the names of facilities and location information of the facilities.

The vehicle-mounted device 100 of this embodiment has a control unit 104. The control unit 104 has a computing unit 1042. The control unit 104 is connected to the wireless communication module 102 and the database 106. The control unit 104 obtains vehicle-mounted-device reference location information from the map information 1062 stored in the database 106, based on outside-source reference facility information received from the wireless communication module 102. The control unit 104 feeds the outside-source reference facility information and the vehicle-mounted-device reference location information to the computing unit 1042. The computing unit 1042 compares outside-source reference location information included in the outside-source reference facility information, with the vehicle-mounted-device reference location information, and calculates an error between the locations indicated by these items of location information. For example, the computing unit 1042 may calculate a difference or differences in the coordinates included in the above two items of location information, or may calculate differences in the latitude and longitude included in the above two items of location information. The control unit 104 feeds the location error calculated by the computing unit 1042, as a location correction factor, to a location correction factor storage unit 108.

The vehicle-mounted device 100 has the location correction factor storage unit 108. The location correction factor storage unit 108 is connected to the control unit 104. The location correction factor storage unit 108 stores the location error received from the control unit 104, as a location correction factor. The location correction factor storage unit 108 may store the location error in relation to each company that provides maps, or may store the location error in relation to each company that use maps when providing information. Thus, the location correction factor storage unit 108 is arranged to output the location correction factor for correcting destination location information included in destination facility information, based on the outside-source reference facility information transmitted from the outside to the vehicle-mounted device 100.

The vehicle-mounted device 100 of this embodiment has a route searching unit 110. The route searching unit 110 is connected to the database 106, control unit 104, and the location correction factor storage unit 108. The route searching unit 110 conducts a search for a route. For example, the route searching unit 110 performs calculation for measuring the location of the vehicle-mounted device 100, based on a positioning signal transmitted from a satellite, using Global Navigation Satellite System (GNSS). The route searching unit 110 receives destination facility information which the control unit 104 obtains from the outside of the vehicle-mounted device 100. The outside includes the communication network 300 and recording media. Then, the route searching unit 110 obtains a location correction factor used for correcting destination location information included in the destination facility information. More specifically, when the route searching unit 110 receives the destination facility information from one of the terminal units 400, it specifies the terminal unit 400$_1$, 400$_2$ from which the destination facility information was obtained. The route searching unit 110 may specify the company A, B in which the terminal unit 400 in question is provided. The route searching unit 100 obtains a location correction factor corresponding to a region including the location indicated by the destination location information, from the location correction factor storage unit 108, according to the specified terminal unit 400$_1$, 400$_2$, or company A, B. Then, the route searching unit 110 corrects the destination location information using the location correction factor.

The route searching unit 100 has an arrival location obtaining unit 1102. The arrival location obtaining unit 1102 determines whether the corrected location information indicates a point within the site of the facility for which the arrival location is set, referring to the map information 1062 and facility information 1064 stored in the database 106. Generally, when a navigation system makes a search for a route to a certain facility, it often sets an arrival location to a road adjacent to the facility, or a parking lot for the facility, rather than setting it at the center of the facility. Then, the system makes a search for a route to the arrival location. If the corrected location information indicates a point within the site of the facility for which the arrival location is set on the map information 1062, the arrival location obtaining unit 1102 obtains arrival-point coordinates (arrival location information) indicating the arrival location. In this case, the route searching unit 110 makes a search for a route to the arrival location obtained by the arrival location obtaining unit 1102. On the other hand, if it is determined that the corrected location information does not indicate a point within the site of the facility for which the arrival location is set on the map information, the route searching unit 110 makes a search for a route to the location indicated by the corrected location information.

The vehicle-mounted device 100 may have an externally connecting unit 112. The externally connecting unit 112 is connected to the control unit 104. The externally connecting unit 112 takes outside-source facility information into the vehicle-mounted device 100. The externally connecting unit 112 may consist of a driver capable of reading facility information recorded on a CD-R and/or a DVD. Also, the externally connecting unit 112 may consist of a connector that can be connected to a USB memory. Also, the externally connecting unit 112 may consist of a driver capable of reading facility information recorded on a SD card.

Figure 3:
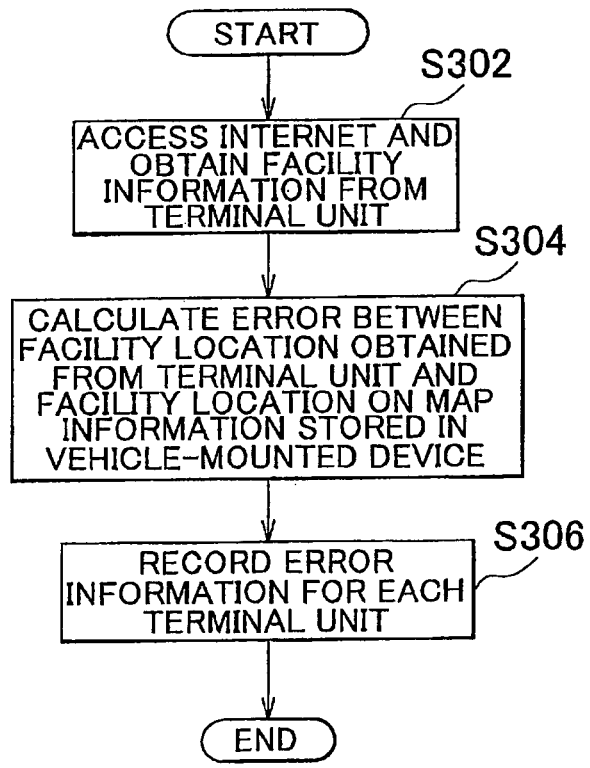
FIG. 3 is a flowchart illustrating a process implemented by the vehicle-mounted device according to the first embodiment of the invention.

FIG. 3 is a flowchart illustrating a process of accumulating location correction factors, in the vehicle-mounted device 100 of the system of this embodiment.

The vehicle-mounted device 100 makes access to the communication network 300, and obtains outside-source reference facility information of a given facility from the terminal unit 400 (step S302). For example, the control unit 104 controls the wireless communication module 102 so as to make access to the communication network 300 at certain intervals and obtain the outside-source reference facility information from the terminal unit 400. The outside-source reference facility information may be obtained when the vehicle-mounted device 100 is turned on, or may be obtained according to the user's operation to obtain the outside-source reference facility information. The above-indicated given facility is preferably selected from facilities present across Japan, whose names and locations will not be changed, since it is preferable to obtain location correction factors for regions throughout the entire country of Japan. If the name or location of a certain facility is changed, the change may not be reflected by map information stored in the vehicle-mounted device 100; therefore, the facility obtained from the outside may not be included in the map information stored in the vehicle-mounted device 100. For example, municipal offices may be used as the given facility. The vehicle-mounted device 100 calculates an error between the location indicated by the outside-source reference location information of the given facility obtained in step S302 and the location indicated by the vehicle-mounted-device reference location information of the same facility (step S304). For example, the control unit 104 obtains location information of the facility corresponding to the name of the given facility included in the outside-source reference facility information, as the vehicle-mounted-device reference location information, from the facility information 1064 stored in the database 106. Then, the computing unit 1042 calculates an error between the location indicated by the outside-source reference location information and the location indicated by the vehicle-mounted-device reference location information. For example, the computing unit 1042 may obtain the error by calculating differences in the latitude and longitude included in the above two items of location information.

The vehicle-mounted device 100 records error information for each terminal unit 400 from which the outside-source reference facility information was obtained (step S306). More specifically, the control unit 104 stores the error information obtained in step S304, as a location correction factor, in the location correction factor storage unit 108. The error information is stored for each terminal unit 400, because the terminal unit 400 of this embodiment is provided for each of the companies, and it is considered that the geodetic system of map information may vary from one company to another. The companies include those that provide maps, and those that use maps when providing information.

While the case where the vehicle-mounted device 100 obtains the outside-source reference facility information from the terminal unit 400 has been explained above with reference to the flowchart of FIG. 3, the information may be obtained from a recording medium. In this case, the outside-source reference facility information is fed from the externally connecting unit 112 to the control unit 104 in step S302 when it is obtained from the recording medium. Then, the operations of steps S304 and S306 are performed, based on the outside-source reference facility information received from the externally connecting unit 112.

Figure 4:
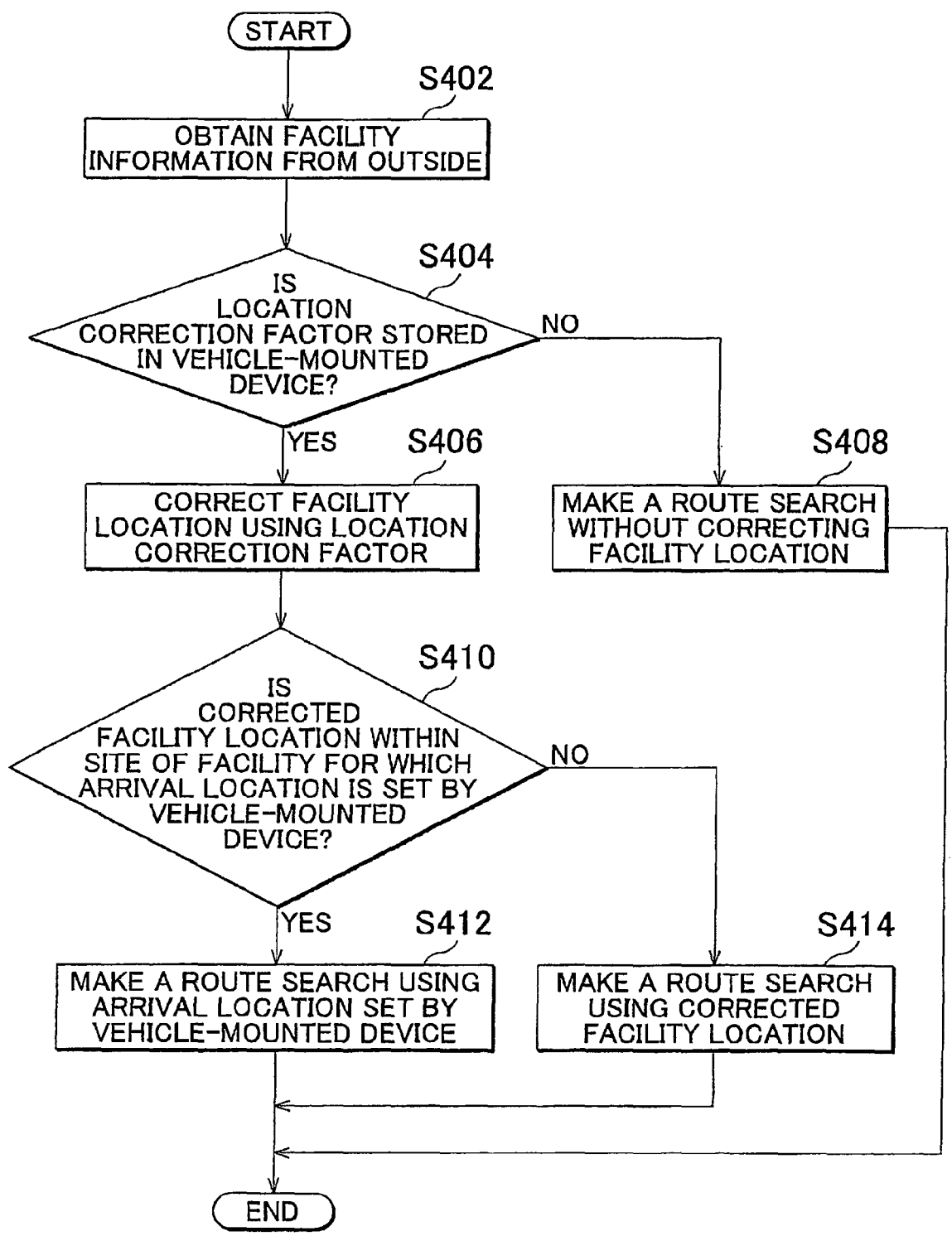
FIG. 4 is a flowchart illustrating a process implemented by the vehicle-mounted device according to the first embodiment of the invention.

FIG. 4 is a flowchart illustrating a route searching process implemented in the vehicle-mounted device 100 of the system of this embodiment.

The vehicle-mounted device 100 obtains outside-source facility information from the outside (step S402). The outside includes the communication network 300 and recording media. Namely, the vehicle-mounted device 100 makes access to the communication network 300, and obtains destination facility information from the terminal unit 400, or obtains destination facility information from a recording medium. More specifically, the control unit 104 controls the wireless communication module 102 so as to make access to the communication network 300 and obtain destination facility information from the terminal unit 400. The control unit 104 may obtain destination facility information from the terminal unit 400, according to the user's operation. In another example, the externally connecting unit 112 obtains destination facility information from a recording medium.

The vehicle-mounted device 100 determines whether a location correction factor for correcting destination location information included in the destination facility information is stored, based on the destination facility information obtained in step S402, i.e., the information received from the wireless communication module 102 and/or the externally connecting unit 112 (step S404). More specifically, the control unit 104 determines whether a location correction factor corresponding to a region including the location indicated by the destination location information is stored.

If no location correction factor for correcting the destination location information is stored (i.e., if NO is obtained in step S404), the vehicle-mounted device 100 makes a search for a route to the destination without correcting the destination location information (step S408). More specifically, when it is determined that no location correction factor corresponding to the region including the location indicated by the destination location information is stored, the control unit 104 feeds the destination facility information to the route searching unit 110. The route searching unit 110 makes a route search based on the destination location information, without correcting the destination location information, and displays the route thus found at a corresponding location on the map information 1062.

If the location correction factor for correcting the destination location information is stored (i.e., if YES is obtained in step S404), the vehicle-mounted device 100 corrects the destination location information, using the location correction factor (step S406). More specifically, when the control unit 104 determines that the location correction factor corresponding to the region including the location indicated by the destination location information is stored, the control unit 104 feeds the destination facility information to the route searching unit 110, and informs the route searching unit 110 that the location correction factor is stored. The route searching unit 110 obtains the location correction factor from the location correction factor storage unit 108. Then, the route searching unit 110 corrects the destination location information using the location correction factor.

The vehicle-mounted device 100 determines whether the location indicated by the corrected location information is within the site of the facility for which an arrival location is set by the vehicle-mounted device 100 (step S410). More specifically, the arrival location obtaining unit 1102 determines whether the location indicated by the corrected location information is within the site of the facility for which the arrival location is set, out of the facilities included in the map information 1062.

If it is determined that the location indicated by the corrected location information is within the site of the facility for which the arrival location is set by the vehicle-mounted device 100 (i.e., if YES is obtained in step S410), the vehicle-mounted device 100 makes a route search, using the arrival location set by the vehicle-mounted device 100 (step S412). More specifically, the route searching unit 110 makes a search for a route to a point represented by arrival-point coordinates indicating the arrival location.

On the other hand, if it is determined that the location indicated by the corrected location information is not within the site of the facility for which the arrival location is set by the vehicle-mounted device 100 (i.e., if NO is obtained in step S410), the vehicle-mounted device 100 makes a route search using the corrected location information (step S414). More specifically, the route searching unit 110 makes a search for a route to the location indicated by the corrected location information.

According to this embodiment, the vehicle-mounted device capable of obtaining facility information from the outside is provided. The vehicle-mounted device stores an error between a location indicated by location information of a reference facility obtained from the outside and a location indicated by the location information of the same reference facility stored in the vehicle-mounted device, as a location correction factor. Then, when the vehicle-mounted device obtains facility information of a facility as a destination from the outside, it corrects location information included in the facility information, using the location correction factor, and makes a search for a route to the destination. The facility information obtained from the outside includes facility information retrieved from a website, and facility information recorded in recording media. Thus, in this embodiment in which the location information included in the facility information obtained from the outside can be corrected by the vehicle-mounted device, even when the name of the facility is changed, the user is able to search for a route to the facility based on the new name of the facility, through searching the website and so forth. It is difficult for the vehicle-mounted device to reflect changes in the names of facilities in real time. Therefore, the vehicle-mounted device has a great advantage that it can make a route search based on location information included in facility information retrieved from a website.

Also, in this embodiment, the location information included in the facility information obtained from the outside can be corrected, using the location correction factor, so that the corrected location information matches map information stored in the vehicle-mounted device. Through the correction, a difference in the location information due to a difference in the geodetic system can be reduced or eliminated. Also, through the correction, a difference in the location information due to distortion in the network of reference points can be reduced or eliminated. Thus, facility information prepared based on different geodetic systems, as well as facility information prepared based on the same geodetic system as the information stored in the vehicle-mounted device, can be used, thus making it possible to make a point of interest (POI) search over an extended range or area.

Second Embodiment

Figure 5:
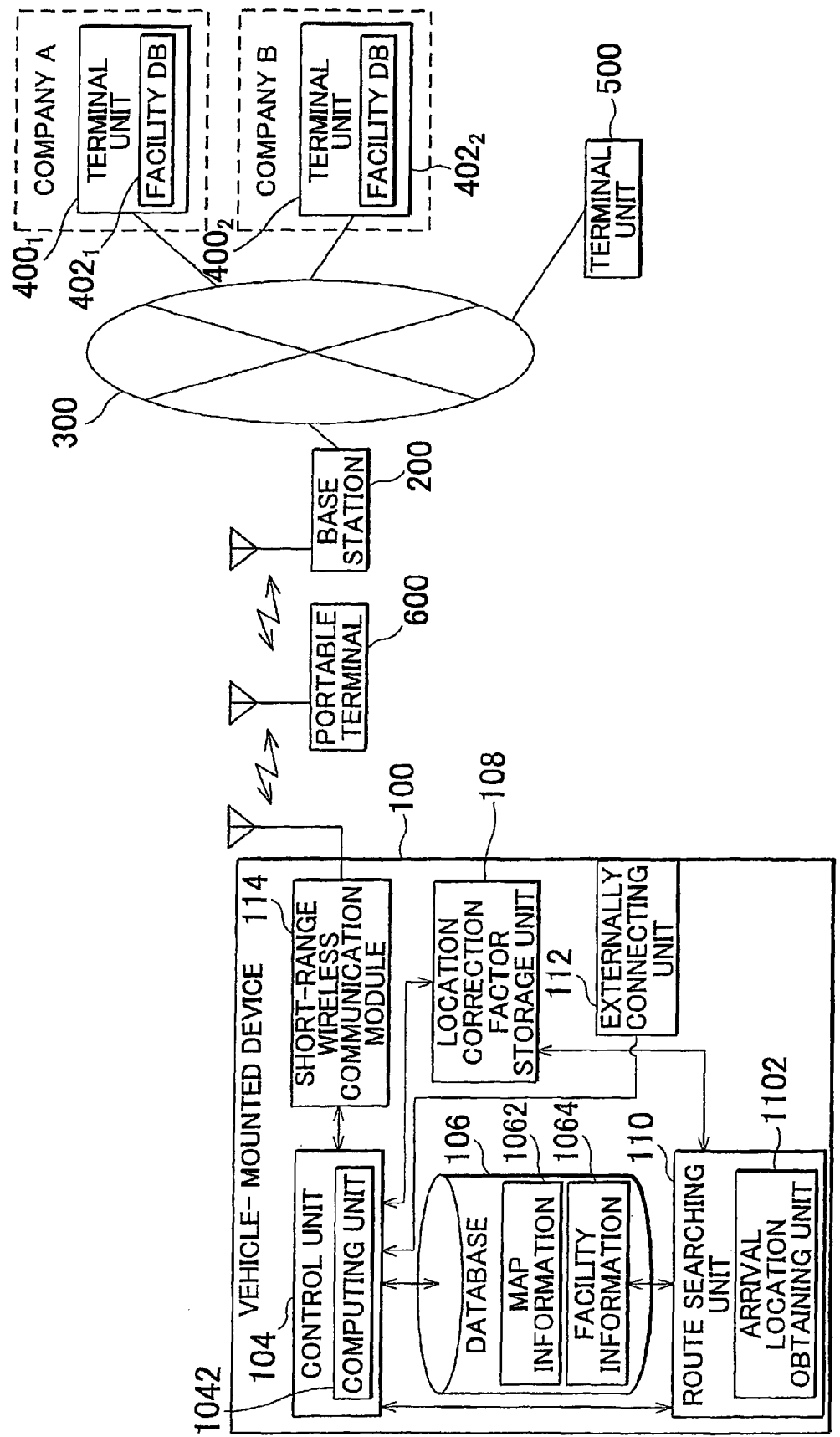
FIG. 5 is an explanatory view showing one example of system in which a vehicle-mounted device according to a second embodiment of the invention is used.

FIG. 5 shows a system in which a vehicle-mounted device according to a second embodiment of the invention is used.

The system shown in FIG. 5 has a portable terminal 600, in addition to the system of the first embodiment as described above. The system is substantially identical with that of the first embodiment, except for the provision of the portable terminal 600. The system of FIG. 5 conducts wireless communications with the portable terminal 600. Also, the portable terminal 600 conducts wireless communications with the base station 200.

The portable terminal 600 according to the second embodiment is wirelessly connected to the base station 200, to conduct wireless communications with the base station 200 in a certain mode of wireless communication. The wireless communication mode or system may be selected from, for example, GSM, Wideband CDMA, CDMA, and PDC. Also, the wireless communication modes may also include a next-generation wireless communication mode(s).

The portable terminal 600 has a short-range wireless communication module (not shown). The short-range wireless communication module conducts wireless communications with the vehicle-mounted device 100 according to a short-range wireless communication technology. In other words, the vehicle-mounted device 100 and the base station 200 are wirelessly connected to each other via the portable terminal 600.

The vehicle-mounted device 100 of the second embodiment is different from the vehicle-mounted device 100 of the first embodiment as described above in that the vehicle-mounted device 100 of the second embodiment has a short-range wireless communication module 114 in place of the wireless communication module 102.

The short-range wireless communication module 114 consists of, for example, a Bluetooth (BT) module. When the portable terminal 600 is located within a Bluetooth communicating range or zone, a communication circuit or line is established between the short-range wireless communication module 114 and the portable terminal 600, to enable communications pursuant to the Bluetooth as a communication standard. The short-range wireless communication module 114 has a radio frequency (RF) portion that serves as a physical layer for establishing wireless communications, and a Bluetooth (BT) portion that performs operations according to the Bluetooth specifications. As connecting methods of the RF portion pursuant to the Bluetooth, Synchronous Connection Oriented (SCO) link and Asynchronous Connectionless (ACL) link are defined. The SCO link is a point-to-point link of a line connection type which is formed between the short-range wireless communication module 114 and the portable terminal 600, and is mainly used for transfer of voice data. The ACL link is a link formed between the module 114 and the portable terminal 600 so as to make connection of a packet exchange type, and is mainly used for data transfer or transmission.

In a Bluetooth system, a device that calls up a connectable BT module in a paging mode, using a paging message, is called "master", and a device that is connected to the master in response to the paging message in a standby mode will be called "slave". A network formed between the master and the slave will be called "piconet". In this embodiment, the vehicle-mounted device 100 may be set as "master", and the portable terminal 600 may be set as "slave".

The short-range wireless communication module 114 cooperates with the portable terminal 600 to carry out an operation to establish synchronism within the piconet, an operation to encode/decode signals to be transmitted and received, and so forth. When transmitting data, the short-range wireless communication module 114 performs digital modulation on a carrier-wave signal with data to be transmitted, and sends the modulated carrier-wave signal over a wide spectrum of frequencies according to the spread spectrum technology, through frequency hopping, i.e., switching of frequencies at given time intervals. After amplifying the transmission signal to a transmission output level equal to or lower than a specified value, the short-range wireless communication module 114 transmits the signal from an antenna to the portable terminal 600 at the other end of communications. The short-range wireless communication module 114 also receives a radio signal from the portable terminal 600, via the antenna, and performs digital demodulation on the radio signal after spectrum-de-spreading the signal.

The short-range wireless communication module 114 is provided with a specific ID, and identifies the other end of communications to which the module 114 is connected, using the ID. Also, when the short-range wireless communication module 114 is connected to a certain device for the first time, a PIN (personal identification number) key needs to be entered. If the correct PIN key is entered, paring of the module 114 and the device is completed. Once the paring is completed, only one of these two devices is required to enter the piconet so as to establish connection therebetween. The short-range wireless communication module 114 feeds facility information obtained from the portable terminal 600, to the control unit 104.

In the following, a process of calculating location correction factors in the vehicle-mounted device 100 will be described. In step S302 of the flowchart of FIG. 3, the vehicle-mounted device 100 makes access to the communication network 300 via the portable terminal 600 and the base station 200, and requests outside-source reference facility information from the terminal unit 400. The terminal unit 400 sends the outside-source reference facility information to the vehicle-mounted device 100, in response to the request from the vehicle-mounted device 100. The vehicle-mounted device 100 obtains the outside-source reference facility information from the portable terminal 600. More specifically, the short-range wireless communication module 114 and the portable terminal 600 are wirelessly connected to each other according to a short-range wireless communication technology. The portable terminal 600 and the base station 200 are wirelessly connected to each other, for wireless communications in a certain mode of wireless communication. The control unit 104 controls the short-range wireless communication module 114 so as to make access to the communication network 300 at certain intervals, and obtain outside-source reference facility information of a given facility from the terminal unit 400. The outside-source reference facility information may be obtained when the vehicle-mounted device 100 is turned on, or may be obtained according to the user's operation. The above-indicated given facility is preferably selected from facilities present across Japan, whose names and locations will not be changed, since it is preferable to obtain location correction factors for regions throughout the entire country of Japan. This is also because the facility obtained from the outside may not be included in map information stored in the vehicle-mounted device 100 if the name or location of the facility is changed. For example, municipal offices may be used as the given facility.

Steps S304 and S306 are the same as those of the first embodiment, and therefore will not be explained.

Next, a route searching process implemented in the vehicle-mounted device 100 will be described. In step S402 of the flowchart of FIG. 4, the vehicle-mounted device 100 obtains destination facility information from the outside thereof. The outside includes communication networks and recording media. Namely, the vehicle-mounted device 100 makes access to the communication network 300 via the portable terminal 600 and the base station 200, and obtains destination facility information from the terminal unit 400, or obtains destination facility information from a recording medium. More specifically, the control unit 104 controls the short-range wireless communication module 114 so as to make access to the communication network 300 and obtain destination facility information from the terminal unit 400. The control unit 104 may obtain destination facility information from the terminal unit 400, according to the user's operation. In another example, the externally connecting unit 112 may obtain destination facility information from a recording medium.

Step S404 and subsequent steps are the same as those of the first embodiment, and therefore will not be explained.

According to this embodiment, the vehicle-mounted device capable of obtaining facility information from the outside via the portable terminal is provided. The vehicle-mounted device stores an error between the location information about a reference facility obtained from the outside and the corresponding location information stored in the vehicle-mounted device, as a location correction factor. Then, when the vehicle-mounted device obtains facility information of a facility as a destination from the outside, it corrects location information included in the facility information, using the location correction factor, and makes a search for a route to the destination. The facility information obtained from the outside includes facility information retrieved from a website, and facility information recorded in recording media. Thus, in this embodiment in which the location information included in the facility information obtained from the outside can be corrected by the vehicle-mounted device, the user is able to search for a route to the facility based on the new name of the facility, through searching the website and so forth. It is difficult for the vehicle-mounted device to reflect changes in the names of facilities in real time. Therefore, the vehicle-mounted device has a great advantage that it can make a route search based on location information included in facility information retrieved from a website.

Also, in this embodiment, the location information included in the facility information obtained from the outside can be corrected, using the location correction factor, so that the corrected location information matches map information stored in the vehicle-mounted device. Through the correction, a difference in the location information due to a difference in the geodetic system can be reduced or eliminated. Also, through the correction, a difference in the location information due to distortion in the network of reference points can be reduced or eliminated. Thus, facility information prepared based on different geodetic systems, as well as facility information prepared based on the same geodetic system as the information stored in the vehicle-mounted device, can be used, thus making it possible to make a point of interest (POI) search over an extended range or area.

Third Embodiment

Figure 6:
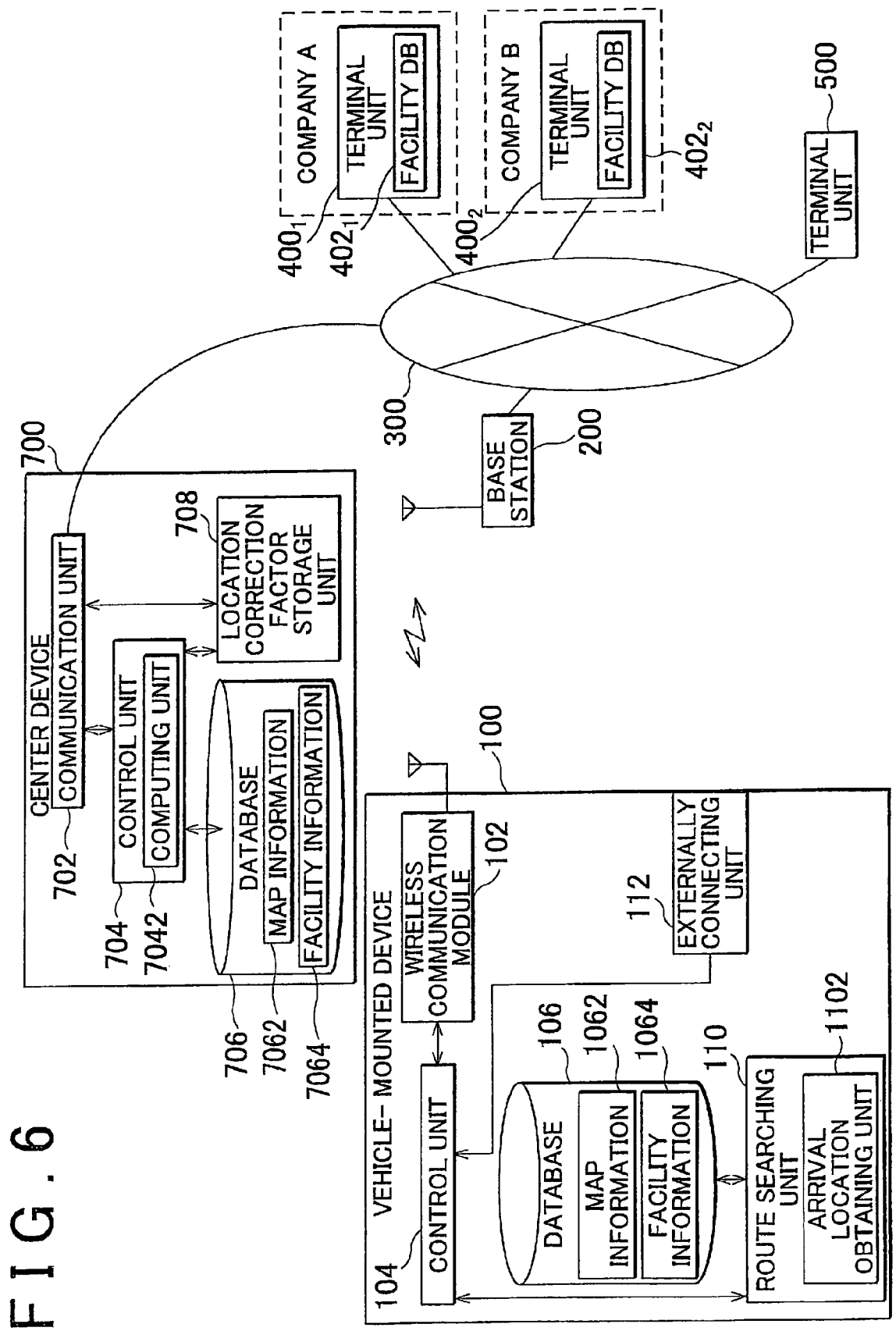
FIG. 6 is an explanatory view showing one example of system according to a third embodiment of the invention.

FIG. 6 shows a system in which a vehicle-mounted device according to a third embodiment of the invention is used.

The system shown in FIG. 6 has a center device 700, in addition to the system of the first embodiment as described above.

The center device 700 is connected to the communication network 300. The center device 700 obtains outside-source reference facility information regarding a given facility, which is stored in the terminal unit 400, from the terminal unit 400 connected to the communication network 300. Then, the center device 700 compares outside-source reference location information included in the outside-source reference facility information, with location information of the same facility stored in the center device 700, and calculate an error between the locations indicated by these items of location information. The above-indicated location information of the given facility stored in the center device 700 indicates the location of the given facility on map information identical with or similar to map information stored in the vehicle-mounted device 100, and is thus regarded as vehicle-mounted-device reference location information.

The center device 700 stores the error in location as a location correction factor. The location error may be stored for each company that provides maps, or may be stored for each company that uses maps when it provides information. This is because all of the maps provided or used by a certain company are supposed to be created or prepared based on the same geodetic system.

The center device 700 may be adapted to perform calculations of location errors at certain intervals. Also, the center device 700 may calculate a location error for each specified region, for example, for each of the municipalities (cities, towns and villages). In this connection, the network of reference points based on the Japanese Geodetic System is established by a triangulation network formed from old survey results. Accordingly, the network of reference points based on the Japanese Geodetic System involves distortion due to a factor other than the geodetic system. By calculating a location error for each specified region, an influence due to the distortion of the network of reference points can be reduced.

The vehicle-mounted device 100 makes a search for a route to a destination designated by the user. If the destination is a facility obtained from the outside, the vehicle-mounted device 100 obtains a location correction factor corresponding to destination location information included in the destination facility information, from the center device 700, when it makes a search for the route. The above-mentioned outside includes the communication network 300 and recording media. Then, the vehicle-mounted device 100 corrects the destination location information using the location correction factor. For example, the vehicle-mounted device 100 may specify the company in which the terminal unit 400 is provided, and obtain a location correction factor that is selected from location correction factors calculated for the specified company and corresponds to a region including the location indicated by the destination location information.

The vehicle-mounted device 100 of the third embodiment is different from the vehicle-mounted device 100 of the first embodiment in that the vehicle-mounted device 100 of the third embodiment does not have the computing unit and the location information correction factor storage unit.

The route searching unit 110 is connected to the control unit 104 and the database 106. The route searching unit 110 conducts a search for a route. The route searching unit 110 receives destination facility information which the control unit 104 obtains from the outside. The outside includes the communication network 300 and recording media. Then, the control unit 104 obtains a location correction factor used for correcting the destination location information, from the center device 700. More specifically, when the control unit 104 receives destination facility information from one of the terminal units 400, it specifies the terminal unit $400_1$, $400_2$ from which the destination facility information was obtained. The control unit 104 may specify the company A, B in which the terminal unit 400 is provided. The control unit 104 obtains the location correction factor corresponding to the region including the location indicated by the destination location information, from the center device 700, according to the specified terminal unit 400₁, 400₂, or company A, B. The control unit 104 feeds the destination facility information and the location correction factor to the route searching unit 110. The route searching unit 110 corrects the destination location information using the location correction factor.

More specifically, the control unit 104 issues a request to the center device 700 via the wireless communication module 102, for the location correction factor corresponding to the region including the location indicated by the destination location information. The wireless communication module 102 makes access to the center device 700, via the base station 200, in response to the request from the control unit 104, and requests the location correction factor from the center device 700. If the center device 700 stores the location correction factor requested by the vehicle-mounted device 100, it transmits the location correction factor to the vehicle-mounted device 100. If the center device 700 does not store the location correction factor requested by the vehicle-mounted device 100, the device 700 may transmit a message that the location correction factor is not stored (there is no corresponding location correction factor). The location correction factor is transmitted to the vehicle-mounted device 100, via the communication network 300 and the base station 200. In this manner, the control unit 104 receives the location correction factor transmitted from the center device 700, via the wireless communication module 102. The control unit 104 feeds the location correction factor, as well as the destination facility information, to the route searching unit 110. The route searching unit 110 corrects the destination location information using the location correction factor.

The arrival location obtaining unit 1102 determines whether the corrected location information indicates a point within the site of the facility for which the arrival location is set on the map information 1062, referring to the map information 1062 and facility information 1064 stored in the database 106. If it is determined that the corrected location information indicates a point within the site of the facility for which the arrival location is set on the map information 1062, the arrival location obtaining unit 1102 obtains arrival-point coordinates indicating the arrival location. In this case, the route searching unit 110 makes a search for a route to the arrival-point coordinates obtained by the arrival location obtaining unit 1102. On the other hand, if it is determined that the corrected location information does not indicate a point within the site of the facility for which the arrival location is set on the map information 1062, the route searching unit 110 makes a search for a route to the location indicated by the corrected location information.

The center device 700 of the third embodiment has a communication unit 702. The communication unit 702 is connected to the communication network 300 via a cable or wirelessly. For example, the communication unit 702 may be wirelessly connected to the communication network 300, via a wireless LAN base station.

The center device 700 has a database 706. Map information 7062 and facility information 7064 are stored in the database 706. The map information 7062 is substantially the same as map information stored in the vehicle-mounted device 100. The map information 7062 may be prepared based on the Japanese Geodetic System. The facility information 7064 is information regarding facilities contained in the map information 7062. The facility information 7064 may include the names of the facilities and location information indicating the locations of the facilities.

The center device 700 has a control unit 704. The control unit 704 has a computing unit 7042. The control unit 704 is connected to the communication unit 702, database 706, and a location correction factor storage unit 708. The control unit 704 obtains vehicle-mounted-device reference location information from the map information 7062 stored in the database 706, based on the outside-source reference facility information received from the communication unit 702. The control unit 704 feeds the outside-source reference facility information received from the communication unit 702, and the vehicle-mounted-device reference location information obtained from the database 706, to the computing unit 7042. The computing unit 7042 compares the outside-source reference location information with the vehicle-mounted-device reference location information, and calculates an error between the locations indicated by these items of location information. The control unit 704 feeds the error in location, as a location correction factor, to the location correction factor storage unit 708.

The control unit 704 determines, in response to a request from the vehicle-mounted device 100, whether the location correction factor corresponding to the region including the location indicated by the destination location information is stored in the location correction factor storage unit 708. If the control unit 704 determines that the location correction factor requested by the vehicle-mounted device 100 is stored, it transmits the location correction factor to the vehicle-mounted device 100. If the control unit 704 determines that the location correction factor requested by the vehicle-mounted device 100 is not stored, it may transmit a message that the location correction factor is not stored (there is no corresponding location correction factor) to the vehicle-mounted device 100.

The center device 700 has the location correction factor storage unit 708. The location correction factor storage unit 708 is connected to the control unit 704. The location correction factor storage unit 708 stores location errors received from the control unit 704, as location correction factors. The location correction factor storage unit 708 may store the location errors for each company that provides maps, or for each company that uses maps when providing information.

Figure 7:
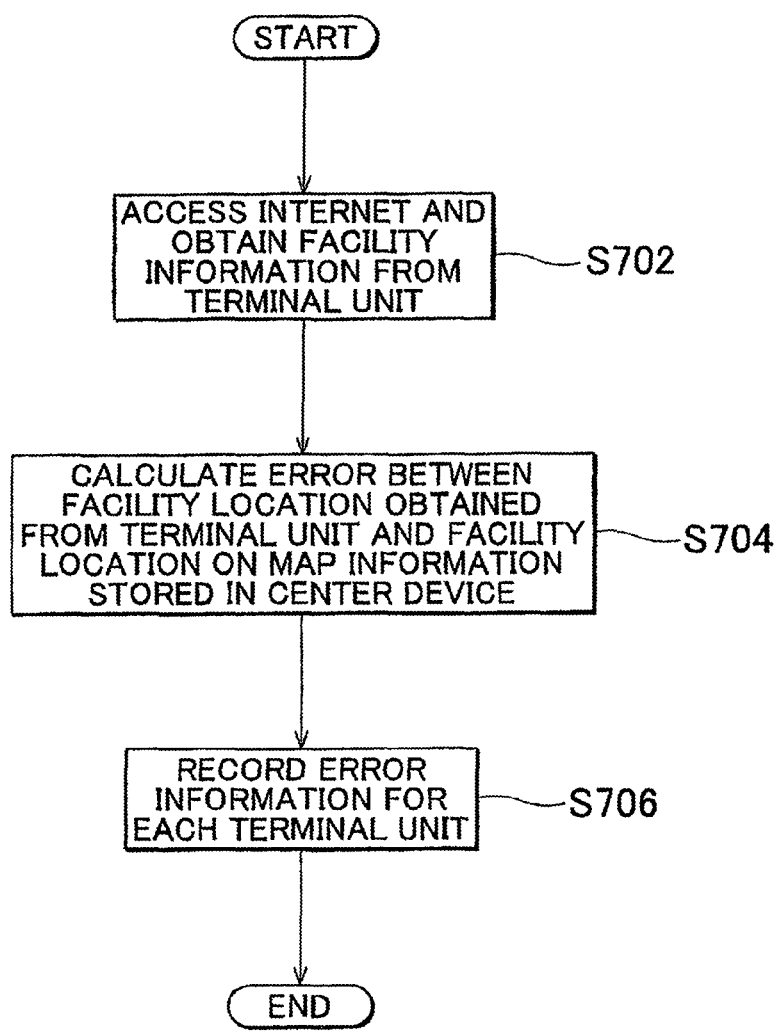
FIG. 7 is a flowchart illustrating a process implemented by a center device according to the third embodiment of the invention.

FIG. 7 is a flowchart illustrating a process of accumulating location correction factors in the center device 700 of the system of this embodiment.

The center device 700 makes access to the communication network 300, and obtains outside-source reference facility information regarding a given facility from the terminal unit 400 (step S702). More specifically, the control unit 704 may control the communication unit 702 to access the communication network 300 at certain intervals, or may control the communication unit 702 to access the communication network 300 according to the operation of the operator of the center device 700.

The control unit 704 obtains the outside-source reference facility information of the given facility from the terminal unit 400. The outside-source reference facility information may be obtained when the center device 700 is turned on, or may be obtained according to the operator's operation. The outside-source reference facility information may be obtained for each specified region, for example, for each of the municipalities (cities, towns and villages). The above-indicated given facility is preferably selected from facilities present across Japan, whose names and locations will not be changed, since it is preferable to obtain location correction factors for regions throughout the entire country of Japan. If the names or locations of some facilities are changed, the facility obtained from the outside may not be included in map information stored in the center device 700. For example, municipal offices may be used as the given facility.

The center device 700 calculates an error between the location indicated by outside-source reference location information included in the outside-source reference facility information obtained in step S702 and the location indicated by the vehicle-mounted-device reference location information on the map information 7062 stored in the center device 700 (step S704). For example, the computing unit 7042 obtains location information of a facility corresponding to the name of the given facility included in the outside-source reference facility information, as vehicle-mounted-device reference location information, from the facility information 7064. Then, the computing unit 7042 calculates an error between the location indicated by the outside-source reference location information and the location indicated by the vehicle-mounted-device reference location information. For example, the computing unit 7042 may obtain the error by calculating differences in the latitude and longitude included in the above two items of location information.

The center device 700 records error information for each terminal unit 400 from which the outside-source reference facility information was obtained (step S706). More specifically, the control unit 704 stores the error information obtained in step S704, as a location correction factor, in the location correction factor storage unit 708. The error information is stored for each terminal unit 400, because the terminal unit 400 of this embodiment is provided for each of the companies, and it is considered that the geodetic system of map information may vary from one company to another. The companies include those that provide maps, and those that use maps when providing information.

While the case where the center device 700 obtains the outside-source reference facility information from the terminal unit 400 has been explained above with reference to the flowchart of FIG. 7, the information may be obtained from a recording medium.

The location correction factors stored in the center device 700 may be managed with respect to each vehicle-mounted device 100. For example, at the time of shipping of the vehicle-mounted device 100, the same map information as the map information stored in the vehicle-mounted device is stored in the center device 700. Also, when the map information stored in the vehicle-mounted device is updated, the same map information as the updated map information may be stored in the center device 700. With the above arrangement in which map information is newly stored in the center device 700 upon shipping of the vehicle-mounted device 100 and/or updating of map information, the location correction factors can be managed with respect to each vehicle-mounted device 100 and/or each map information.

Figure 8:
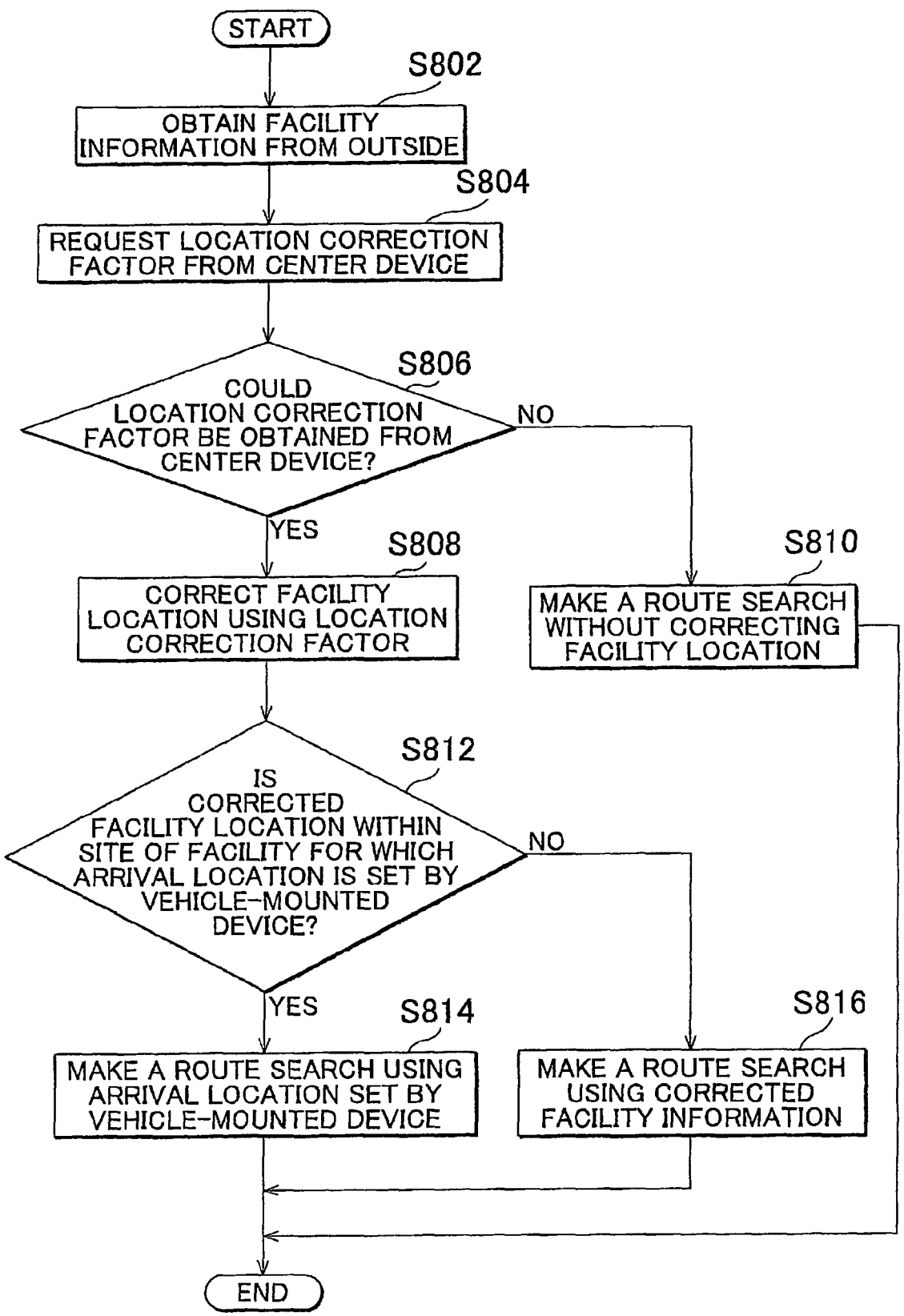
FIG. 8 is a flowchart illustrating a process implemented by a vehicle-mounted device according to the third embodiment of the invention.

FIG. 8 is a flowchart illustrating a route searching process implemented in the vehicle-mounted device 100 of the system of this embodiment.

The vehicle-mounted device 100 obtains destination facility information from the outside (step S802). The outside includes the communication network 300 and recording media. Namely, the vehicle-mounted device 100 makes access to the communication network 300, and obtains destination facility information from the terminal unit 400, or obtains destination facility information from a recording medium. More specifically, the control unit 104 controls the wireless communication module 102 so as to make access to the communication network 300 and obtain destination facility information from the terminal unit 400. The control unit 104 may obtain destination facility information from the terminal unit 400, according to the user's operation. In another example, the externally connecting unit 112 may obtain destination facility information from a recording medium.

The vehicle-mounted device 100 makes a request of the center device 700 for a location correction factor for correcting destination location information included in the destination facility information, based on the destination facility information obtained in step S802 (step S804). More specifically, the control unit 104 makes a request of the center device 700 for a location correction factor corresponding to a region including the location indicated by the destination location information included in the destination facility information received from the wireless communication module 102 and/or the externally connecting unit 112.

The vehicle-mounted device 100 determines whether it was able to obtain the location correction factor requested in step S804 (step S806). More specifically, the vehicle-mounted device 100 determines whether it has received the location correction factor requested in step S804 from the center device 700.

If the vehicle-mounted device 100 cannot obtain the location correction factor for correcting the destination location information (i.e., if NO is obtained in step S806), the vehicle-mounted device 100 makes a route search without correcting the destination location information (step S810). More specifically, when the control unit 104 determines that it cannot obtain the location correction factor corresponding to the region indicated by the destination location information, it feeds the destination facility information to the route searching unit 110. The route searching unit 110 makes a route search based on the destination location information, without correcting the destination location information, and displays the route thus found at a corresponding location on the map information 1062.

If the location correction factor for correcting the destination location information can be obtained (i.e., if YES is obtained in step S806), the vehicle-mounted device 100 corrects the destination location information using the location correction factor (step S808). More specifically, if the control unit 104 can obtain the location correction factor corresponding to the region indicated by the destination location information, it feeds the destination facility information and the location correction factor to the route searching unit 110. The route searching unit 110 corrects the destination location information using the location correction factor.

Step S812 and subsequent steps are identical with or similar to step S410 and subsequent steps as explained above with reference to FIG. 4.

In this embodiment, the vehicle-mounted device 100 may have a location correction factor storage unit 108. In this case, the vehicle-mounted device 100 may download location correction factors from the center device 700, and may accumulate the downloaded location correction factors in the location correction factor storage unit 108 thereof. The downloading may be carried out at regular time intervals, or may be carried out according to the user's operation.

According to this embodiment, the center device that can obtain facility information from the outside and provide location correction factors to the vehicle-mounted device is provided. The center device stores an error between a location indicated by location information of a reference facility obtained from the outside and a location indicated by the corresponding location information stored in the vehicle-mounted device, as a location correction factor. When the vehicle-mounted device obtains facility information of a facility as a destination from the outside, it makes a request of the center device for a location correction factor corresponding to location information included in the facility information. The vehicle-mounted device corrects the location information included in the facility information, using the location correction factor, and makes a search for a route to the destination. The facility information obtained from the outside includes facility information retrieved from a website, and facility information recorded in a recording medium. Thus, in this embodiment in which the location information included in the facility information obtained from the outside can be corrected by the vehicle-mounted device, even when the name of the facility is changed, the user is able to search for a route to the facility based on the new name of the facility, through searching the website and so forth. It is difficult for the vehicle-mounted device to reflect changes in the names of facilities in real time. Therefore, the vehicle-mounted device has a great advantage that it can make a route search based on location information included in facility information retrieved from a website. Also, in this embodiment, the center device performs calculations of location correction factors, which leads to a reduction of the processing load imposed on the vehicle-mounted device. Also, since the location correction factors are accumulated or stored in the center device 700, a larger number of location correction factors can be accumulated or stored as compared with the case where the location correction factors are accumulated in the vehicle-mounted device.

Also, in this embodiment, the location information included in the facility information obtained from the outside can be corrected, using the location correction factor, so that the corrected location information matches map information stored in the vehicle-mounted device. Through the correction, a difference in the location information due to a difference in the geodetic system can be reduced or eliminated. Also, through the correction, a difference in the location information due to distortion in the network of reference points can be reduced or eliminated. Thus, facility information prepared based on different geodetic systems, as well as facility information prepared based on the same geodetic system as the information stored in the vehicle-mounted device, can be used, thus making it possible to make a point of interest (POI) search over an extended range or area.

Fourth Embodiment

Figure 9:
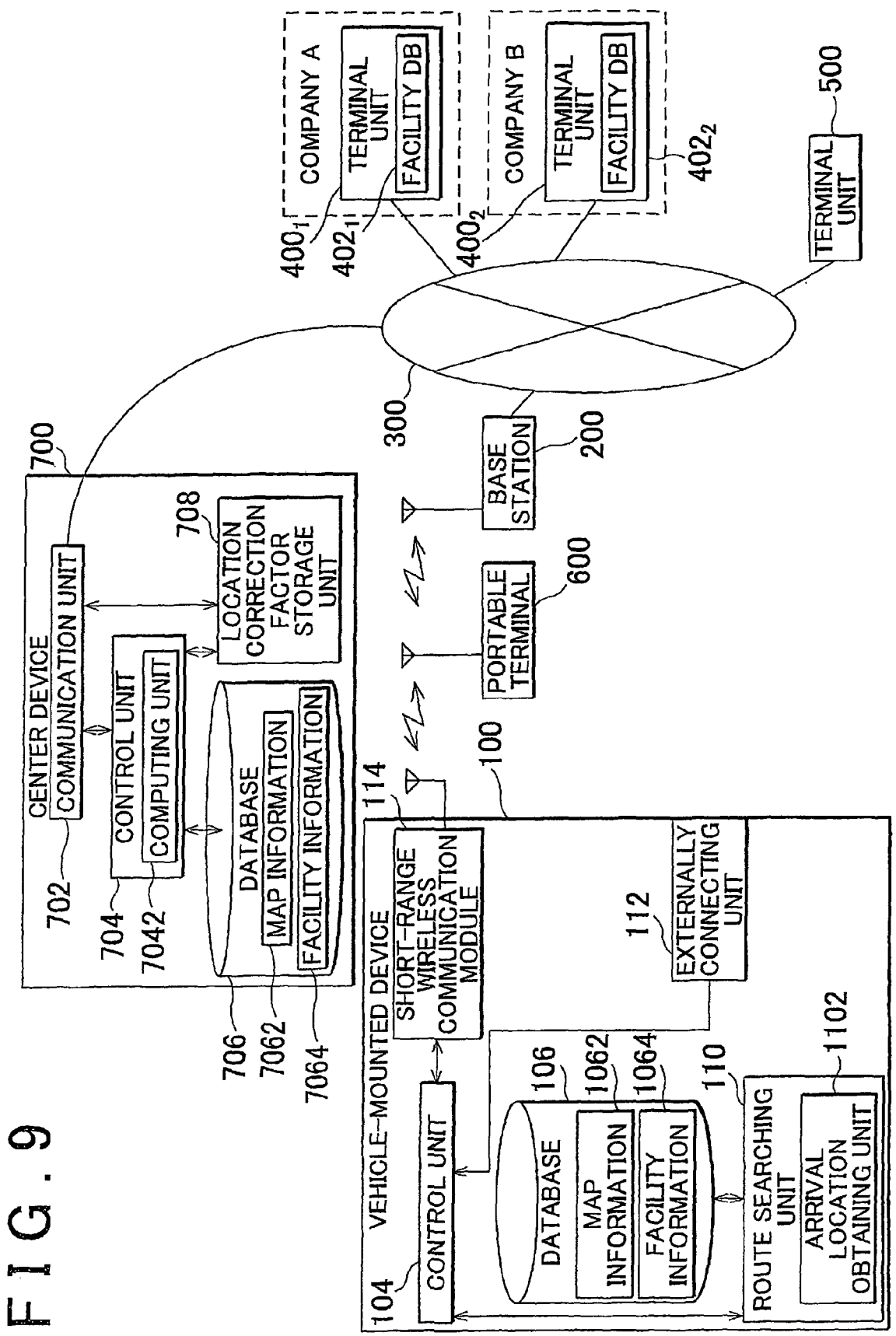
FIG. 9 is an explanatory view showing one example of system according to a fourth embodiment of the invention.

FIG. 9 is a system in which a vehicle-mounted device according to a fourth embodiment of the invention is used.

The system shown in FIG. 9 has a portable terminal 600, in addition to the system of the third embodiment as described above. The system is substantially identical with that of the third embodiment, except for the provision of the portable terminal 600. In the system of this embodiment, the vehicle-mounted device 100 conducts wireless communications with the portable terminal 600. Also, the portable terminal 600 conducts wireless communications with the base station 200.

The portable terminal 600 according to the fourth embodiment is wirelessly connected to the base station 200, to conduct wireless communications with the base station 200 in a certain mode of wireless communication. The wireless communication mode or system may be selected from, for example, GSM, Wideband CDMA, CDMA, and PDC. Also, the wireless communication modes may include a next-generation wireless communication mode(s).

The portable terminal 600 has a short-range wireless communication module (not shown). The short-range wireless communication module conducts wireless communications with the vehicle-mounted device 100 according to a short-range wireless communication technology. In other words, the vehicle-mounted device 100 and the base station 200 are wirelessly connected to each other via the portable terminal 600.

The vehicle-mounted device 100 of the fourth embodiment is different from the vehicle-mounted device 100 of the third embodiment in that the vehicle-mounted device 100 of the fourth embodiment has a short-range wireless communication module 114 in place of the wireless communication module 102.

The short-range wireless communication module 114 is substantially the same as that of the second embodiment.

A process of calculating location correction factors in the center device according to the fourth embodiment is identical with or similar to that of the third embodiment as described above with reference to the flowchart of FIG. 7.

Next, a route searching process implemented in the vehicle-mounted device 100 according to the fourth embodiment will be described. In step S802 of the flowchart of FIG. 8, the vehicle-mounted device 100 obtains destination facility information from the outside. The outside includes the communication network 300 and recording media. Namely, the vehicle-mounted device 100 makes access to the communication network 300, via the portable terminal 600 and the base station 200, and obtains destination facility information from the terminal unit 400, or obtains destination facility information from a recording medium. More specifically, the control unit 104 controls the short-range wireless communication module 114 so as to access the Internet and obtain destination facility information from the terminal unit 400. The control unit 104 may obtain destination facility information from the terminal unit 400, according to the user's operation. In another example, the externally connecting unit 112 may obtain destination facility information from a recording medium.

Step S804 and subsequent steps are identical with or similar to those of the third embodiment, and therefore will not be explained.

In this embodiment, the vehicle-mounted device 100 may have a location correction factor storage unit 108. In this case, the vehicle-mounted device 100 may download location correction factors from the center device 700, and may accumulate or store the downloaded location correction factors in the location correction factor storage unit 108 thereof. The downloading may be carried out at regular time intervals, or may be carried out according to the user's operation.

According to this embodiment, the center device that can obtain facility information from the outside and provide location correction factors to the vehicle-mounted device is provided. The center device stores an error between a location indicated by location information of a reference facility obtained from the outside and a location indicated by the corresponding location information stored in the vehicle-mounted device, as a location correction factor. The vehicle-mounted device can obtain facility information of a facility as a destination from the outside, via the portable terminal. When the vehicle-mounted device obtains the destination facility information in this manner, it makes a request of the center device for a location correction factor corresponding to location information included in the facility information. Then, the vehicle-mounted device corrects the location information included in the facility information, using the location correction factor, and makes a search for a route to the destination. The facility information obtained from the outside includes facility information retrieved from a website, and facility information recorded in a recording medium. Thus, in this embodiment in which the location information included in the facility information obtained from the outside can be corrected by the vehicle-mounted device, even when the name of the facility is changed, the user is able to search for a route to the facility based on the new name of the facility, through searching the website and so forth. In this connection, it is difficult for the vehicle-mounted device to reflect changes in the names of facilities in real time. Therefore, the vehicle-mounted device has a great advantage that it can make a route search based on location information included in facility information retrieved from a website.

Also, in this embodiment, the center device performs calculations of location correction factors, which leads to a reduction of the processing load imposed on the vehicle-mounted device. Also, since the location correction factors are accumulated or stored in the center device 700, a larger number of location correction factors can be accumulated or stored, as compared with the case where the location correction factors are accumulated in the vehicle-mounted device.

Also, in this embodiment, the location information included in the facility information obtained from the outside can be corrected, using the location correction factor, so that the corrected location information matches map information stored in the vehicle-mounted device. Through the correction, a difference in the location information due to a difference in the geodetic system can be reduced or eliminated. Also, through the above correction, a difference in the location information due to distortion in the network of reference points can be reduced or eliminated. Thus, facility information prepared based on different geodetic systems, as well as facility information prepared based on the same geodetic system as the information stored in the vehicle-mounted device, can be used, thus making it possible to make a point of interest (POI) search over an extended range or area.

Fifth Embodiment

Figure 10:
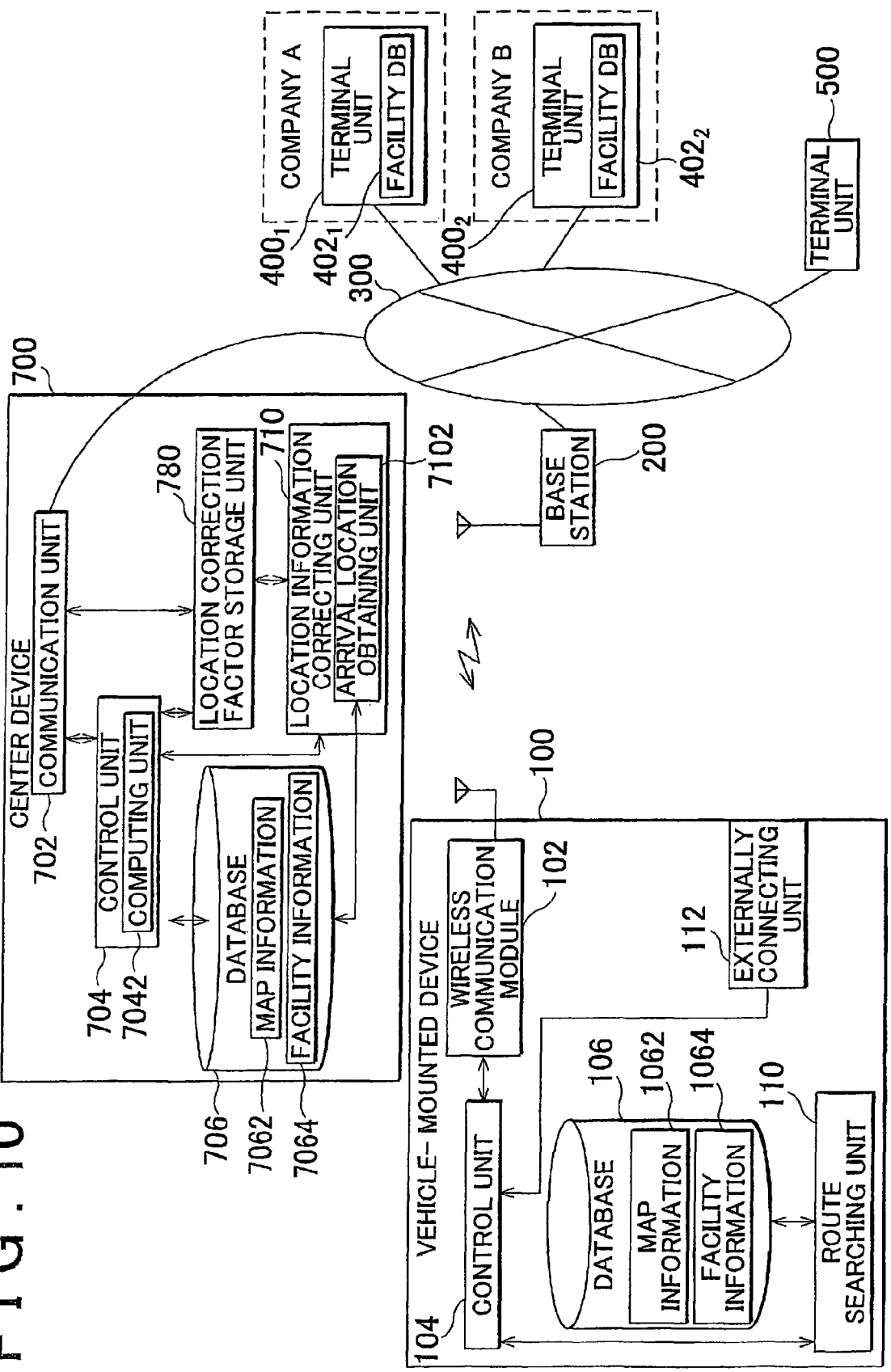
FIG. 10 is an explanatory view showing one example of system according to a fifth embodiment of the invention.

FIG. 10 shows a system in which a vehicle-mounted device according to a fifth embodiment of the invention is used.

The system shown in FIG. 10 is different from the system of the third embodiment as described above in that the center device 700 obtains location information which the vehicle-mounted device 100 uses when making a route search. The center device 700 has a location information correcting unit 710, in addition to the center device of the third embodiment. The location information correcting unit 710 has an arrival location obtaining unit 7102. The vehicle-mounted device 100 does not have the arrival location obtaining unit 1102.

The center device 700 is connected to the communication network 300. The center device 700 obtains outside-source reference facility information regarding a given facility and stored in the terminal unit 400, from the terminal unit 400 connected to the communication network 300. Then, the center device 700 compares outside-source reference location information included in the outside-source reference facility information, with location information regarding the same facility and stored in the center device 700, and calculates an error between the locations indicated by these two items of location information. The above-indicated location information of the given facility stored in the center device 700 indicates the location of the given facility on map information identical with or similar to map information stored in the vehicle-mounted device 100, and is thus regarded as vehicle-mounted-device reference location information.

The center device 700 stores the error in location as a location correction factor. The location error may be stored for each company that provides maps, or may be stored for each company that uses maps when it provides information. This is because all of the maps provided or used by a certain company are supposed to be created or prepared based on the same geodetic system.

The center device 700 may be adapted to perform calculations of location errors at certain intervals. Also, the center device 700 may calculate a location error for each specified region, for example, for each of the municipalities (cities, towns and villages). In this connection, the network of reference points based on the Japanese Geodetic System is established by a triangulation network formed from old survey results. Accordingly, the network of reference points based on the Japanese Geodetic System involves distortion due to a factor other than the geodetic system. By calculating a location error for each specified region, an influence due to the distortion of the network of reference points can be reduced.

When the center device 700 obtains destination facility information from the vehicle-mounted device 100, it obtains a location correction factor corresponding to location information contained in the destination facility information. The center device 700 corrects the destination location information using the location correction factor. For example, the center device 700 may specify the company in which the terminal unit 400 is provided, and obtain a location correction factor that is selected from location correction factors calculated for the specified company and corresponds to a region including the location indicated by the destination location information. The center device 700 determines whether the corrected location information corrected using the location correction factor indicates a location within a site of the facility for which an arrival location is set on map information. If the corrected location information indicates a location within the site of the facility for which the arrival location is set, the center device 700 informs the vehicle-mounted device 100 of the arrival location information (arrival-point coordinates). If the corrected location information does not indicate a location within the site of the facility for which the arrival location is set on map information, the center device 700 informs the vehicle-mounted device 100 of the corrected location information.

The vehicle-mounted device 100 makes a search for a route to a destination designated by the user. When the destination is a facility obtained from the outside, the vehicle-mounted device 100 sends the destination facility information to the center device 700 when making a route search. The outside includes the communication network 300 and recording media. The vehicle-mounted device 100 receives the arrival location information or corrected location information corresponding to the destination facility information, from the center device 700. The vehicle-mounted device 100 makes a route search based on the arrival location information or corrected location information.

The vehicle-mounted device 100 of the fifth embodiment is different from the vehicle-mounted device 100 of the third embodiment as described above in that the vehicle-mounted device 100 of the fifth embodiment dos not have the arrival location obtaining unit.

The route searching unit 110 is connected to the control unit 104 and the database 106. The route searching unit 110 makes a route search. The arrival location information or corrected location information transmitted from the center device 700 is fed to the route searching unit 110. When the control unit 104 obtains destination facility information, it transmits the destination facility information to the center device 700. Then, the control unit 104 obtains the arrival location information or corrected location information corresponding to the facility information, from the center device 700. The control unit 104 feeds the arrival location information or corrected location information obtained from the center device 700, along with the destination facility information, to the route searching unit 110.

More specifically, the control unit 104 sends destination location information included in the destination facility information to the center device 700, and requests the corresponding arrival location information or corrected location information from the center device 700, via the wireless communication module 102. The wireless communication module 102 makes access to the center device 700, via the base station 200, in response to a request made by the control unit 104, and sends the destination location information to the center device 700 while requesting the corresponding arrival location information or corrected location information from the center device 700. When the control unit 104 receives the arrival location information or corrected location information from the center device 700, it feeds the arrival location information or corrected location information to the route searching unit 110. The route searching unit 110 makes a route search based on the arrival location information or corrected location information.

The center device 700 according to the fifth embodiment is different from the center device of the third embodiment as described above in that the center device 700 of the fifth embodiment has the location information correcting unit 710. The location information correcting unit 710 has the arrival location obtaining unit 7102.

The location information correcting unit 710 corrects the destination location information, using a location correction factor corresponding to the destination location information transmitted from the vehicle-mounted device 100. The communication unit 702 receives the destination location information transmitted from the vehicle-mounted device 100, and feeds the received information to the control unit 704. The control unit 704 feeds the destination location information received from the communication unit 702, to the location information correcting unit 710. The location information correcting unit 710 obtains a correction factor corresponding to the destination location information, from the location correction factors stored in the location correction factor storage unit 708. The location information correcting unit 710 corrects the destination location information using the correction factor. Furthermore, the arrival location obtaining unit 7102 determines whether the corrected location information indicates a point within the site of the facility for which an arrival location is set on map information, referring to the map information 7062 and facility information 7064 stored in the database 706. If the corrected location information indicates a point within the site of the facility for which the arrival location is set, the location information correcting unit 710 feeds the arrival location information to the control unit 704. If the corrected location information does not indicate a point within the site of the facility for which the arrival location is set, the location information correcting unit 710 feeds the corrected location information to the control unit 704. The control unit 704 sends the corrected location information or arrival location information received from the location information correcting unit 710, to the vehicle-mounted device 100, via the communication unit 702.

A process of accumulating location correction factors in the center device 700 of the system of this embodiment is the same as or similar to that of the third embodiment as described above with reference to FIG. 7.

The location correction factors stored in the center device 700 may be managed with respect to each vehicle-mounted device 100. For example, at the time of shipping of the vehicle-mounted device 100, the same or similar map information as the map information stored in the vehicle-mounted device is stored in the center device 700. Also, when the map information stored in the vehicle-mounted device is updated, the same or similar map information as the updated map information may be stored in the center device 700. With the arrangement in which map information is newly stored in the center device 700 upon shipping of the vehicle-mounted device 100 and/or updating of map information, the location correction factors can be managed with respect to each vehicle-mounted device 100 and/or each map information.

Figure 11:
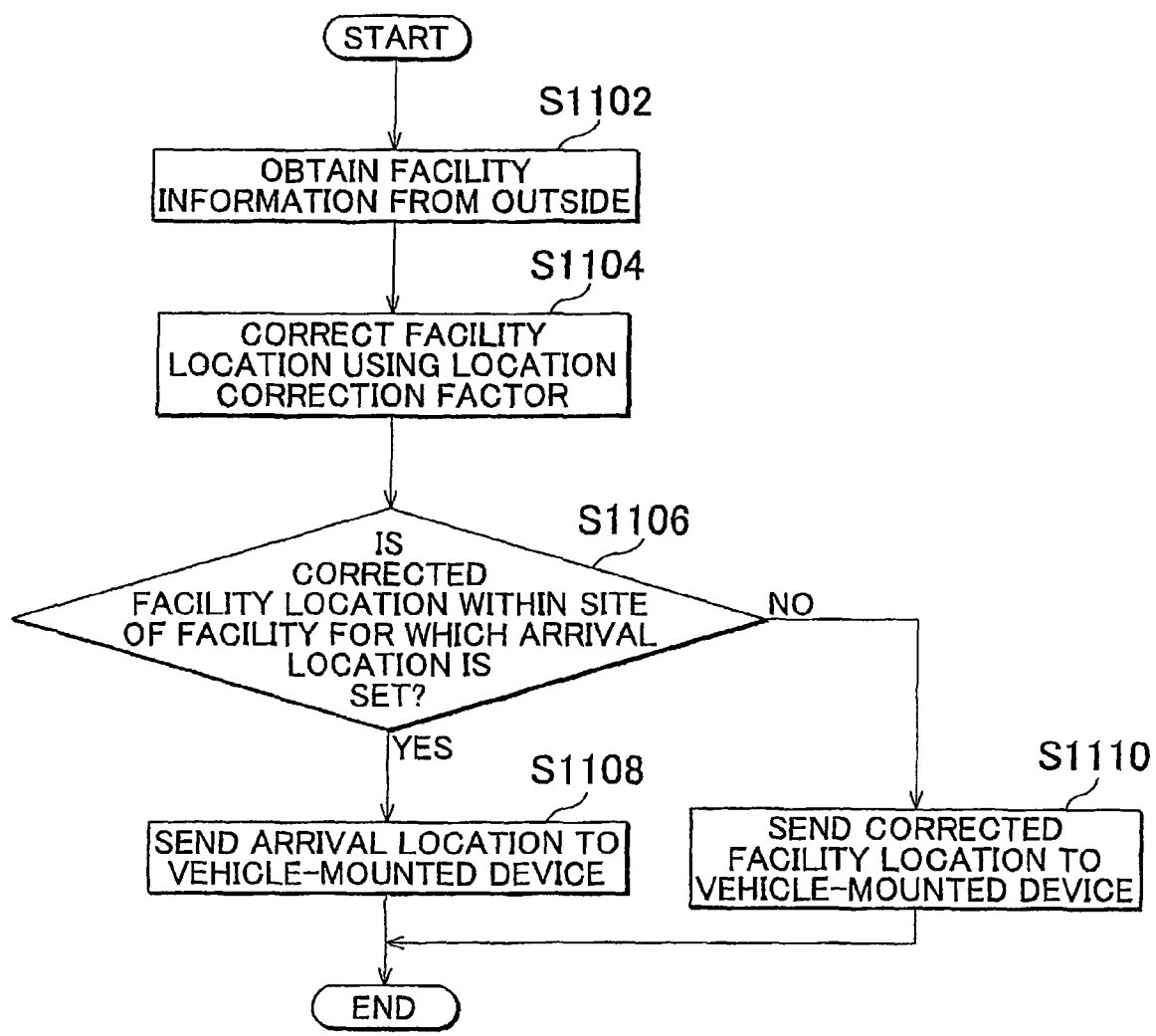
FIG. 11 is a flowchart illustrating a process implemented by a center device according to the fifth embodiment of the invention.

FIG. 11 is a flowchart illustrating a process of correcting location information in the center device 700 of the system of this embodiment.

The center device 700 obtains destination facility information from the outside (step S1102). The outside may include the vehicle-mounted device 100, communication network 300, and recording media. More specifically, the vehicle-mounted device 100 makes access to the communication network 300, sends destination location information to the center device 700, and requests the corresponding arrival location information or corrected location information from the center device 700. The communication unit 702 receives the destination location information, and feeds the received information to the control unit 704. The control unit 704 feeds the destination location information received from the communication unit 702, to the location information correcting unit 710.

The center device 700 corrects the destination location information using the location correction factor (step S1104). More specifically, the location information correcting unit 710 obtains a corresponding location correction factor from the location correction factors stored in the location correction factor storage unit 708, based on the destination location information. The location information correcting unit 710 corrects the destination location information, using the location correction factor obtained from the location correction factor storage unit 708.

The center device 700 determines whether the corrected location information indicates a point within the site of the facility for which the arrival location is set (step S1106). More specifically, the arrival location obtaining unit 7102 determines whether the corrected location information indicates a point within the site of the facility for which the arrival location is set, referring to the map information 7062 and facility information 7064 stored in the database 706.

If it is determined that the corrected location information indicates a point within the site of the facility for which the arrival location is set (i.e., if YES is obtained in step S1106), the center device 700 sends the arrival location information (e.g., coordinates of the arrival location) to the vehicle-mounted device 100 (step S1108). More specifically, when it is determined that the corrected location information indicates a point within the site of the facility for which the arrival location is set, the arrival location obtaining unit 7102 obtains the arrival location information. The arrival location obtaining unit 7102 feeds the arrival location information to the control unit 704. Then, the control unit 704 controls the communication unit 702 so as to send the arrival location information to the vehicle-mounted device 100.

If it is determined that the corrected location information does not indicate a point within the site of the facility for which the arrival location is set (i.e., if NO is obtained in step S1106), the center unit 700 sends the corrected location information to the vehicle-mounted device 100 (step S1110). More specifically, when it is determined that the corrected location information does not indicate a point within the site of the facility for which the arrival location is set, the arrival location obtaining unit 7102 informs the location information correcting unit 710 that it cannot obtain the arrival location information. The location information correcting unit 710 feeds the corrected location information to the control unit 704, based on the information that the arrival location obtaining unit 7102 cannot obtain the arrival location information. The control unit 704 control the communication unit 702 so as to send the corrected location information from the communication unit 702 to the vehicle-mounted device 100.

Figure 12:
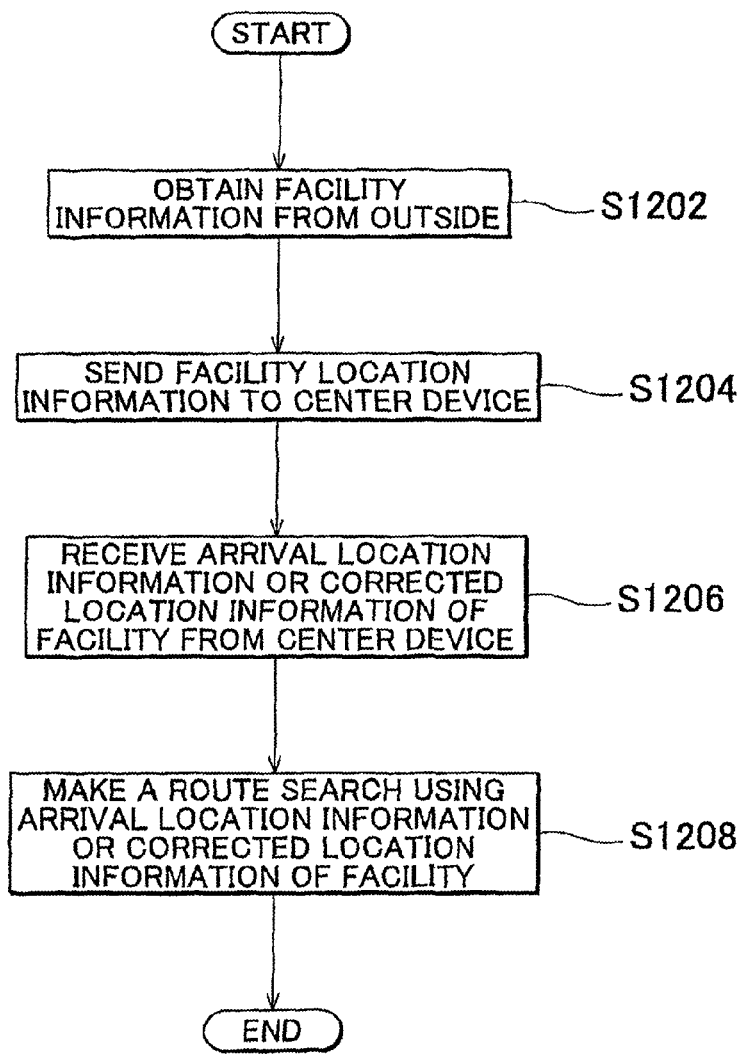
FIG. 12 is a flowchart illustrating a process implemented by a vehicle-mounted device according to the fifth embodiment of the invention.

FIG. 12 is a flowchart illustrating a route searching process implemented in the vehicle-mounted device 100 of the system of this embodiment.

The vehicle-mounted device 100 obtains destination facility information from the outside (step S1202). The outside includes the communication network 300 and recording media. Namely, the vehicle-mounted device 100 makes access to the communication network 300 and obtains destination facility information from the terminal unit 400. Alternatively, the vehicle-mounted device 100 may obtain destination facility information from a recording medium. More specifically, the control unit 104 controls the wireless communication module 102 so as to access the communication network 300 and obtain destination facility information from the terminal unit 400. The control unit 104 may also control the wireless communication module 102 to obtain destination facility information from the terminal unit 400 according to the user's operation. Also, the externally connecting unit 112 may obtain outside-source facility information from a recording medium.

The vehicle-mounted device 100 sends destination location information included in the destination facility information, to the center device 700, based on the destination facility information obtained in step S1202 (step S1204). More specifically, the control unit 104 sends the destination location information included in the destination facility information received via the wireless communication module 102 and/or externally connecting unit 112, to the center device 700.

In response to the destination location information transmitted from the vehicle-mounted device 100 in step S1204, the vehicle-mounted device 100 receives corresponding arrival location information or corrected location information (step S1206). For example, the arrival location information or corrected location information transmitted from the center device 700 is received by the wireless communication module 102, and is fed to control unit 104. The control unit 104 feeds the arrival location information or corrected location information received from the wireless communication module 102, to the route searching unit 110.

The vehicle-mounted device 100 makes a route search using the arrival location information or corrected location information obtained in step S1206 (step S1208). More specifically, the route searching unit 110 makes a route search using the arrival location information or corrected location information.

According to this embodiment, the center device obtains facility information from the outside, and stores an error between a location indicated by location information of a reference facility obtained from the outside, and a location indicated by the corresponding location information stored in the vehicle-mounted device, as a location correction factor. When the vehicle-mounted device obtains facility information of a facility as a destination from the outside, it sends location information included in the facility information to the center device. The facility information obtained from the outside includes facility information retrieved from a website, and facility information recorded on a recording medium. Then, the center device corrects the facility location information transmitted from the vehicle-mounted device, based on the location correction factor. Furthermore, the center device determines whether the corrected location information indicates a point within the site of the facility for which an arrival location is set on map information. If the location indicated by the corrected location information is within the site of the facility, the center device informs the vehicle-mounted device of the arrival location information. If the location indicated by the corrected location information is not within the site of the facility, the center device informs the vehicle-mounted device of the corrected location information. Thus, in this embodiment in which the location information included in the facility information obtained from the outside can be corrected by the center device, even when the name of the facility is changed, the user is able to search for a route to the facility based on the new name of the facility, through searching the website and so forth. It is difficult for the vehicle-mounted device to reflect changes in the names of facilities in real time. Therefore, the vehicle-mounted device has a great advantage that it can make a search for a route based on location information included in facility information retrieved from a website.

Also, in this embodiment, the center device performs calculations of the location correction factors and correction of the facility location information, which leads to a further reduction of the processing load on the vehicle-mounted device. Also, since the location correction factors are accumulated or stored in the center device, a larger number of location correction factors can be accumulated or stored as compared with the case where the location correction factors are accumulated in the vehicle-mounted device.

Also, in this embodiment, the destination location information obtained from the outside can be corrected, using the location correction factor, so that the corrected location information matches map information stored in the vehicle-mounted device. Through the correction, a difference in the location information due to a difference in the geodetic system can be reduced or eliminated. Also, through the correction, a difference in the location information due to distortion in the network of reference points can be reduced or eliminated. Thus, facility information prepared based on different geodetic systems, as well as facility information prepared based on the same geodetic system as the information stored in the vehicle-mounted device, can be used, thus making it possible to make a point of interest (POI) search over an extended range or area.

Sixth Embodiment

FIG. 13 shows a system in which a vehicle-mounted device according to a sixth embodiment of the invention is used.

The system shown in FIG. 13 has a portable terminal 600, in addition to the system of the fifth embodiment as described above. The system of the sixth embodiment is identical with that of the fifth embodiment except for the provision of the portable terminal 600. In the system of this embodiment, the vehicle-mounted device 100 conducts wireless communications with the portable terminal 600. Also, the portable terminal 600 conducts wireless communications with the base station 200.

The portable terminal 600 is wirelessly connected to the base station 200, to conduct wireless communications with the base station 200 in a certain mode of wireless communication. The wireless communication mode or system may be selected from, for example, GSM, Wideband CDMA, CDMA, and PDC. Also, the wireless communication modes may also include a next-generation wireless communication mode(s).

The portable terminal 600 has a short-range wireless communication module (not shown). The short-range wireless communication module conducts wireless communications with the vehicle-mounted device 100 according to a short-range wireless communication technology. In other words, the vehicle-mounted device 100 and the base station 200 are wirelessly connected to each other via the portable terminal 600.

The vehicle-mounted device 100 according to the sixth embodiment is different from the vehicle-mounted device 100 of the fifth embodiment as described above in that the vehicle-mounted device 100 of the sixth embodiment has a short-range wireless communication module 114 in place of the wireless communication module 102.

The short-range wireless communication module 114 is the same as or similar to that of the second embodiment.

A process of calculating location correction factors in the center device 700 is the same as or is similar to that of the third embodiment as described above with reference to the flowchart of FIG. 7.

A process of correcting location information in the center device 700 is the same as or is similar to that of the fifth embodiment as described above with reference to the flowchart of FIG. 11.

A route searching process implemented in the vehicle-mounted device 100 will be explained. In step S1202 of the flowchart of FIG. 12, the vehicle-mounted device 100 obtains destination facility information from the outside. The outside includes the communication network 300 and recording media. Namely, the vehicle-mounted device 100 makes access to the communication network 300 via the portable terminal 600 and the base station 200, and obtains destination facility information from the terminal unit 400. Alternatively, the vehicle-mounted device 100 may obtain destination facility information from a recording medium. More specifically, the control unit 104 causes the short-range wireless communication module 114 to access the Internet and obtain destination facility information from the terminal unit 400. The control unit 104 may also cause the short-range wireless communication module 114 to obtain destination facility information from the terminal unit 400 according to the user's operation. Also, the externally connecting unit 112 may obtain destination facility information from a recording medium.

Step S1204 and subsequent steps are the same as those of the fifth embodiment, and therefore will not be explained.

According to this embodiment, the center device obtains facility information from the outside, and stores an error between a location indicated by location information of a reference facility obtained from the outside, and a location indicated by the corresponding location information stored in the vehicle-mounted device, as a location correction factor. The vehicle-mounted device can obtain facility information of a facility as a destination from the outside, via the portable terminal. The facility information obtained from the outside includes facility information retrieved from a website and facility information recorded in a recording medium. When the destination facility information is designated in this manner, the vehicle-mounted device sends facility location information included in the facility information to the center device. Then, the center device corrects the facility location information transmitted from the vehicle-mounted device, based on the location correction factor. Furthermore, the center device determines whether the corrected location information indicates a point within the site of the facility for which an arrival location is set on map information. If the location indicated by the corrected location information is within the site of the facility, the center device informs the vehicle-mounted device of the arrival location information. If the location indicated by the corrected location information is not within the site of the facility, the center device informs the vehicle-mounted device of the corrected location information. Thus, in this embodiment in which the location information included in the facility information obtained from the outside can be corrected by the center device, even when the name of the facility is changed, the user is able to search for a route to the facility based on the new name of the facility, through searching the website and so forth. It is difficult for the vehicle-mounted device to reflect changes in the names of facilities in real time. Therefore, the vehicle-mounted device has a great advantage that it can make a search for a route based on facility information retrieved from the outside, such as a website.

Also, in this embodiment, the center device performs calculations of the location correction factors and correction of the facility location information, which leads to a further reduction of the processing load on the vehicle-mounted device. Also, since the location correction factors are accumulated or stored in the center device, a larger number of location correction factors can be accumulated or stored as compared with the case where the location correction factors are accumulated in the vehicle-mounted device.

Also, in this embodiment, the destination location information obtained from the outside can be corrected, using the location correction factor, so that the corrected location information matches map information stored in the vehicle-mounted device. Through the correction, a difference in the location information due to a difference in the geodetic system can be reduced or eliminated. Also, through the correction, a difference in the location information due to distortion in the network of reference points can be reduced or eliminated. Thus, facility information prepared based on different geodetic systems, as well as facility information prepared based on the same geodetic system as the information stored in the vehicle-mounted device, can be used, thus making it possible to make a point of interest (POI) search over an extended range or area.

According to the illustrated embodiments of the invention, the vehicle-mounted device that makes a route search is provided. In the vehicle-mounted device, the control unit functions as the above-mentioned reference location information obtaining unit, location information obtaining unit, and corresponding location information obtaining unit of this invention. Also, the computing unit and location correction factor storage unit of the vehicle-mounted device function as the location correction factor calculating unit and location correction factor storage unit, respectively, of this invention. Also, the route searching unit of the vehicle-mounted device functions as the location information correcting unit and route searching unit of this invention.

With the vehicle-mounted device as described above, a location correction factor used when correcting location information of a desired facility is calculated, based on reference location information of a given point, such as a given facility, obtained from the outside of the vehicle-mounted device, and corresponding location information that corresponds to the given point and is obtained from map information and facility information stored in the vehicle-mounted device, so that the location information of the facility obtained from the outside of the vehicle-mounted device can be corrected so as to match the map information stored in the vehicle-mounted device. Also, the vehicle-mounted device can make a search for a route to the desired facility, based on the corrected location information of the desired facility.

Furthermore, the control unit of the vehicle-mounted device makes access to a communication network, and obtains location information of a given point or location from a terminal unit connected to the communication network. Thus, the control unit obtains the location information of the given point from the terminal unit connected to the communication network, thereby to obtain location information of a facility retrieved from, for example, a website.

Furthermore, the computing unit of the vehicle-mounted device calculates the location correction factor when the geodetic system of reference location information obtained by the control unit is different from the geodetic system of the corresponding location information. Thus, the location correction factor for eliminating a difference or variation in location caused by a difference in the geodetic system can be calculated when the geodetic systems of the two items of location information are different from each other.

Furthermore, the vehicle-mounted device has the arrival location obtaining unit that functions as the determining unit of the invention. When it is determined that the corrected location information of the desired facility indicates a point within a region of the facility for which an arrival location is set, the route searching unit makes a search for a route to the arrival location of the facility.

Thus, when it is determined that the corrected location information of the desired facility indicates a point within the region of the facility for which the arrival location is set, the route searching unit can make a search for a route to an appropriate location, i.e., to the arrival location of the facility.

According to the illustrated embodiments of the invention, the center device that provides information to the vehicle-mounted device that makes a route search is provided. In the center device, the control unit functions as the reference location information obtaining unit and corresponding location obtaining unit of this invention. Also, the computing unit and location correction factor storage unit of the center device function as the location correction factor calculating unit and location correction factor storage unit, respectively, of this invention.

With the center device as described above, a location correction factor used when correcting location information of a desired facility is calculated, based on reference location information of a given point obtained from the outside of the vehicle-mounted device, and corresponding location information of a point corresponding to the given point, which is obtained from location information stored in the center device which is the same as or similar to location information stored in the vehicle-mounted device, so that the location correction factor for correcting the location information of the facility obtained from the outside of the vehicle-mounted device so as to match map information stored in the vehicle-mounted device can be supplied to the vehicle-mounted device.

According to the illustrated embodiments of the invention, the center device that provides information to the vehicle-mounted device that makes a route search is provided. In the center device, the control unit functions as the reference location information obtaining unit, location information obtaining unit and corresponding location information obtaining unit of this invention. Also, the computing unit, location correction factor storage unit, location information correcting unit, and communication unit of the center device function as the location correction factor calculating unit, location correction factor storage unit, location information correcting unit, and corrected location information transmitting unit, respectively, of this invention.

The center device as described above calculates a location correction factor used when correcting location information of a desired facility, based on reference location information of a given point obtained from the outside of the vehicle-mounted device, and corresponding location information of a point corresponding to the given point, which is obtained from location information stored in the center device which is the same as or similar to location information stored in the vehicle-mounted device. The center device corrects location information of a facility obtained from the outside of the vehicle-mounted device, which information is transmitted from the vehicle-mounted device, for example, using the correction factor, so that the corrected location information matches map information stored in the vehicle-mounted device, and provides the corrected facility location information to the vehicle-mounted device.

Furthermore, the center device has the arrival location obtaining unit that functions as the determining unit of this invention. When the arrival location obtaining unit determines that the location information of the desired facility corrected by the location information correcting unit indicates a point within the region of the facility for which the arrival location is set, the above-indicated transmitting unit transmits the arrival location of the facility to the vehicle-mounted device.

Thus, when it is determined that the corrected location information of the desired facility indicates a point within the region of the facility for which the arrival location is set, the center device informs the vehicle-mounted device of the arrival location of the facility, so that the vehicle-mounted device can make a search for a route to an appropriate location, i.e., to the arrival location.

While the invention has been described with reference to specific embodiments thereof, these embodiments are merely exemplary ones, and those skill in the art would understand various modified examples, improvements, alternatives, replacements, and so forth. While the system according to each embodiment of the invention has been described referring to a functional block diagram, for the sake of convenience in explanation, the system may be implemented by hardware, software, or a combination thereof. It is to be understood that the invention is not limited to the illustrated embodiments, but may be embodied with various modifications, improvements, replacements, and so forth, without departing from the principle of the invention.

The invention claimed is:

1. A route searching method implemented by a route search device that is installed on a mobile unit and has a database in which facility information and map information are stored, comprising:
   obtaining reference location information as location information of a given point, from an outside of the route search device;
   obtaining location information of a desired facility from the outside;
   obtaining corresponding location information as location information of a point corresponding to the given point, from the database;
   calculating a location correction factor used for correcting the location information of the desired facility, based on the reference location information and the corresponding location information;
   storing the location correction factor;
   correcting the location information of the desired facility, using the location correction factor;
   determining whether the corrected location information of the desired facility indicates a point within a region of facility information stored in the database and for which an arrival location is set; and making a search for a route to the desired facility and displaying the route thus found, wherein a search for a route is made to the arrival location when it is determined that the corrected location information of the desired facility indicates a point within the region of the facility for which the arrival location is set, or a search for a route is made to a location indicated by the corrected location information when it is determined that the corrected location information of the desired facility does not indicate a point within the region of the facility for which the arrival location is set.

2. An information providing method implemented by an information providing device that provides information to a route search device that is installed on a mobile unit, wherein the route search device stores map information and facility information, the method comprising:

obtaining reference location information as location information of a given point, from an outside of the route search device;

obtaining location information of a desired facility from the outside of the route search device;

obtaining corresponding location information as location information of a point corresponding to the given point, from a database in which map information and facility information similar to the map information and facility information stored in the route search device are stored;

calculating a location correction factor used for correcting the location information of the desired facility, based on the reference location information and the corresponding location information;

storing the location correction factor;

correcting the location information of the desired facility, using the location correction factor;

determining whether the corrected location information of the desired facility indicates a point within a region of an arrival location set and stored in the database; and transmitting the corrected location information or the arrival location to the route search device, the route search device making a search for a route to the desired facility and displaying the route thus found, wherein the corrected location information of the desired facility is transmitted to the route search device when it is determined that the corrected location information of the desired facility does not indicate a point within the region of the facility for which the arrival location is set, or the arrival location for the facility is transmitted to the route search device when it is determined that the corrected location information of the desired facility indicates a point within the region of the facility for which the arrival location is set.

3. A route search device installed on a mobile unit, comprising:

a database in which map information and facility information are stored;

a reference location information obtaining unit that obtains reference location information as location information of a given point from an outside of the route search device;

a location information obtaining unit that obtains location information of a desired facility from the outside of the route search device;

a corresponding location information obtaining unit that obtains corresponding location information as location information of a point corresponding to the given point, from the database;

a location correction factor calculating unit that calculates a location correction factor used for correcting the location information of the desired facility, based on the reference location information and the corresponding location information;

a location correction factor storage unit that stores the location correction factor;

a location information correcting unit that corrects the location information of the desired facility, using the location correction factor;

a determining unit that determines whether the corrected location information of the desired facility indicates a point within a region of facility information stored in the database and for which an arrival location is set; and a route searching unit that makes a search for a route to the desired facility and displays the route thus found, wherein the route searching unit makes a search for a route to the arrival location when the determining unit determines that the corrected location information of the desired facility indicates a point within the region of the facility for which the arrival location is set, or the route searching unit makes a search for a route to a location indicated by the corrected location information when the determining unit determines that the corrected location information of the desired facility does not indicate a point within the region of the facility for which the arrival location is set.

4. The route search device according to claim 3, wherein the reference location information obtaining unit makes access to a communication network, and obtains the location information of the given point from a terminal unit connected to the communication network.

5. The route search device according to claim 3, wherein the location correction factor calculating unit calculates the location correction factor when a geodetic system of the reference location information is different from that of the corresponding location information.

6. The route search device according to claim 3, wherein the reference location information comprises location information of a given facility.

7. The route search device according to claim 3, wherein the location correction factor is a difference between a location indicated by the reference location information and a location indicated by the corresponding location information.

8. An information providing device that provides information to a route search device installed on a mobile unit, comprising:

a database in which map information and facility information similar to map information and facility information stored in the route search device are stored;

a reference location information obtaining unit that obtains reference location information as location information of a given point, from an outside of the route search device;

a location information obtaining unit that obtains location information of a desired facility, from the outside of the route search device;

a corresponding location information obtaining unit that obtains corresponding location information as location information of a point corresponding to the given point, from the database;

a location correction factor calculating unit that calculates a location correction factor used for correcting the location information of the desired facility, based on the reference location information and the corresponding location information;

a location correction factor storage unit that stores the location correction factor;

a location information correcting unit that corrects the location information of the desired facility, using the location correction factor;

a determining unit that determines whether the corrected location information of the desired facility indicates a point within a region of an arrival location is set and stored in the database; and a corrected location information transmitting unit that transmits the corrected location information or the arrival location to the route search device, the route search device making a search for a route to the desired facility and displaying the route thus found, wherein the corrected location information transmitting unit transmits the corrected location information of the desired facility to the route search device when the determining unit determines that the corrected location information of the desired facility does not indicate a point within the region of the facility for which the arrival location is set, or the corrected location information transmitting unit transmits the arrival location for the facility to the route search device when the determining unit determines that the corrected location information of the desired facility indicates a point within the region of the facility for which the arrival location is set.

9. A route search system for a mobile unit, comprising:

a route search device that is installed on the mobile unit and obtains location information of a desired facility from an outside thereof; and an information providing device that provides information to the route search device including:

a database in which map information and facility information similar to map information and facility information stored in the route search device are stored;

a reference location information obtaining unit that obtains reference location information as location information of a given point, from the outside of the route search device;

a corresponding location information obtaining unit that obtains corresponding location information as location information of a point corresponding to the given point, from the database;

a location correction factor calculating unit that calculates a location correction factor used for correcting the location information of the desired facility, based on the reference location information and the corresponding location information;

a location correction factor storage unit that stores the location correction factor; and a location correction factor transmitting unit that transmits the location correction factor to the route search device, wherein the route search device includes:

a location correction factor obtaining unit that obtains the location correction factor from the information providing device;

a location information correcting unit that corrects the location information of the desired facility, using the location correction factor;

a determining unit that determines whether the corrected location information of the desired facility indicates a point within a region of facility information stored in the database and for which an arrival location is set; and a route searching unit that makes a search for a route to the desired facility and displays the route thus found, wherein the route searching unit makes a search for a route to the arrival location when the determining unit determines that the corrected location information of the desired facility indicates a point within the region of the facility for which the arrival location is set, or the route searching unit makes a search for a route to a location indicated by the corrected location information when the determining unit determines that the corrected location information of the desired facility does not indicate a point within the region of the facility for which the arrival location is set.

10. A route search system for a mobile unit, comprising:

a route search device that is installed on the mobile unit and obtains location information of a desired facility from an outside thereof; and an information providing device that provides information to the route search device, including:

a database in which map information and facility information similar to map information and facility information stored in the route search device are stored;

a reference location information obtaining unit that obtains reference location information as location information of a given point, from the outside of the route search device;

a location information obtaining unit that obtains location information of a desired facility from the outside of the route search device;

a corresponding location information obtaining unit that obtains corresponding location information as location information of a point corresponding to the given point, from the database;

a location correction factor calculating unit that calculates a location correction factor used for correcting the location information of the desired facility, based on the reference location information and the corresponding location information;

a location correction factor storage unit that stores the location correction factor;

a location information correcting unit that corrects the location information of the desired facility, using the location correction factor;

a determining unit that determines whether the corrected location information of the desired facility indicates a point within a region of an arrival location set and stored in the database; and a corrected location information transmitting unit that transmits the corrected location information or the arrival location to the route search device, wherein the corrected location information transmitting unit transmits the corrected location information of the desired facility to the route search device when the determining unit determines that the corrected location information of the desired facility does not indicate a point within the region of the facility for which the arrival location is set, or the corrected location information transmitting unit transmits the arrival location for the facility to the route search device when the determining unit determines that the corrected location information of the desired facility indicates a point within the region of the facility for which the arrival location is set, wherein the route search device includes:

a location information obtaining unit that obtains the corrected location information or the arrival location, from the information providing device; and a route searching unit that makes a search for a route to the desired facility, based on the corrected location information or the arrival location, and displays the route thus found.

* * * * *